US012610139B2

(12) United States Patent
Nagano et al.

(10) Patent No.: US 12,610,139 B2
(45) Date of Patent: Apr. 21, 2026

(54) CONTROL APPARATUS, IMAGE PICKUP APPARATUS, LENS APPARATUS, FOCAL PLANE CONTROL METHOD, AND STORAGE MEDIUM THAT CONTROL TILTING OF A FOCAL PLANE OF AN OPTICAL SYSTEM

(71) Applicant: CANON KABUSHIKI KAISHA, Tokyo (JP)

(72) Inventors: Toshimune Nagano, Saitama (JP); Yuichiro Kato, Tochigi (JP); Masayasu Mizushima, Tochigi (JP); Toru Matsumoto, Tochigi (JP); Akino Moriyoshi, Tochigi (JP); Hiroki Osaka, Tochigi (JP); Yoshiki Saji, Kanagawa (JP); Takami Hirasawa, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 109 days.

(21) Appl. No.: 18/432,323

(22) Filed: Feb. 5, 2024

(65) Prior Publication Data

US 2024/0284046 A1 Aug. 22, 2024

(30) Foreign Application Priority Data

Feb. 22, 2023 (JP) ................................. 2023-026747

(51) Int. Cl.
H04N 23/67 (2023.01)
G02B 7/08 (2021.01)
(Continued)

(52) U.S. Cl.
CPC ............... H04N 23/67 (2023.01); G02B 7/08 (2013.01); G02B 7/36 (2013.01); G06T 7/73 (2017.01);
(Continued)

(58) Field of Classification Search
CPC ...... H04N 23/67; H04N 23/61; H04N 23/687; H04N 23/695; H04N 23/673; G02B 7/08; G02B 7/36; G06T 7/73
See application file for complete search history.

(56) References Cited

U.S. PATENT DOCUMENTS 11,159,711 B2 * 10/2021 Kawasaki ............ H04N 23/673
2020/0275032 A1 * 8/2020 Kimura ................ H04N 23/673
(Continued)

FOREIGN PATENT DOCUMENTS

JP        H05107455 A       4/1993
JP        2002250858 A      9/2002
(Continued)

*Primary Examiner* — Gevell V Selby
(74) *Attorney, Agent, or Firm* — ROSSI, KIMMS & McDOWELL LLP

(57) ABSTRACT

A control apparatus includes a memory storing instructions, and a processor configured to execute the instructions to detect a plurality of feature points about an object from image data obtained by imaging, acquire information about distances to the plurality of feature points, and control driving of a movable lens so that a tilt amount of a focal plane in an optical system changes, according to a change in at least one of the information about the distances and a position of one of the plurality of feature points within an imaging area.

17 Claims, 14 Drawing Sheets

(51) Int. Cl.

| | | |
|---|---|---|
| *G02B 7/36* | (2021.01) | |
| *G06T 7/73* | (2017.01) | |
| *H04N 23/61* | (2023.01) | |
| *H04N 23/68* | (2023.01) | |
| *H04N 23/695* | (2023.01) | |

(52) U.S. Cl.
CPC ........... *H04N 23/61* (2023.01); *H04N 23/687* (2023.01); *H04N 23/695* (2023.01)

(56) References Cited

U.S. PATENT DOCUMENTS

| | | |
|---|---|---|
| 2022/0272274 A1 | 8/2022 | Sato et al. |
| 2022/0311930 A1* | 9/2022 | Kamba ................. H04N 23/67 |

FOREIGN PATENT DOCUMENTS

| | | |
|---|---|---|
| JP | 2019090952 A | 6/2019 |
| JP | 2021113909 A | 8/2021 |
| JP | 2022128941 A | 9/2022 |

* cited by examiner

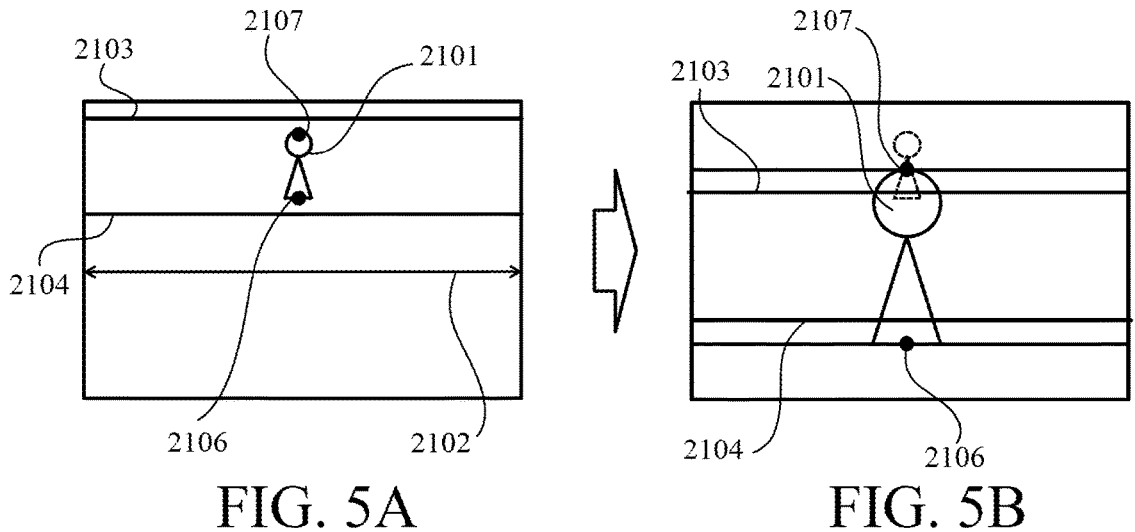
FIG. 5A
FIG. 5B
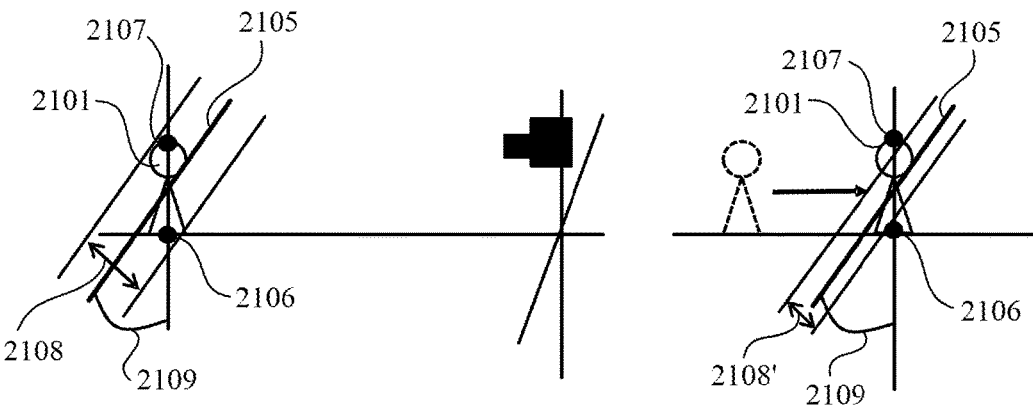
FIG. 6A
FIG. 6B
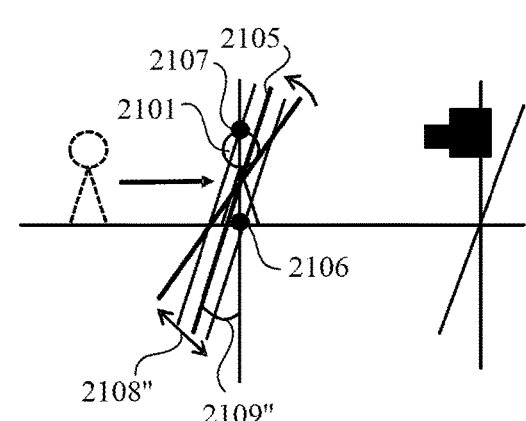
FIG. 6C

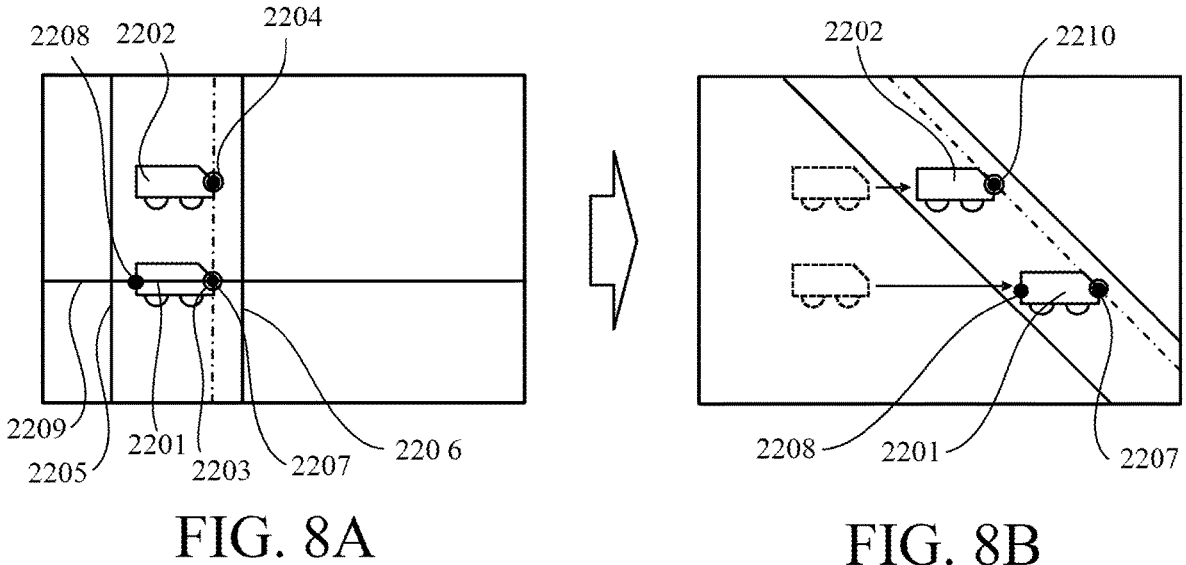
FIG. 8A                              FIG. 8B
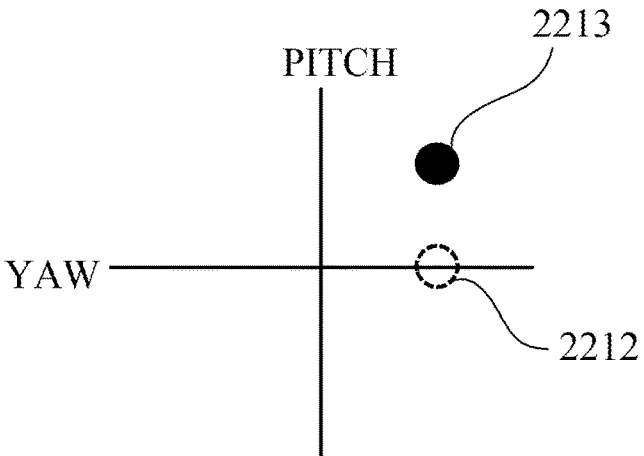
FIG. 9

CONTROL APPARATUS, IMAGE PICKUP APPARATUS, LENS APPARATUS, FOCAL PLANE CONTROL METHOD, AND STORAGE MEDIUM THAT CONTROL TILTING OF A FOCAL PLANE OF AN OPTICAL SYSTEM

BACKGROUND

Technical Field

One of the aspects of the embodiments relates to an image pickup apparatus, such as a video camera and a digital camera.

Description of Related Art

Some optical systems for image pickup apparatuses have a tilt effect that tilts a focal plane so that the entire object plane tilted to a plane orthogonal to the optical axis of the optical system can be in focus. A plurality of objects can be simultaneously in focus using the tilt effect. Japanese Patent Laid-Open No. 2019-090952 discloses an optical system that can provide a tilt effect (and a shift effect that shifts an imaging range) by shifting two lens units in a direction orthogonal to the optical axis. Japanese Patent Laid-Open No. 2021-113909 discloses an image pickup apparatus that determines a direction for tilting a focal plane after detecting objects. Japanese Patent Laid-Open No. 2002-250858 discloses an image pickup apparatus that drives a focus lens according to a distance of a moving object in order to keep the moving object in focus.

It may be difficult to keep a moving object in focus by simply driving the focus lens as in the image pickup apparatus disclosed in Japanese Patent Laid-open No. 2002-250858.

SUMMARY

A control apparatus according to one aspect of the disclosure includes a memory storing instructions, and a processor configured to execute the instructions to detect a plurality of feature points about an object from image data obtained by imaging, acquire information about distances to the plurality of feature points, and control driving of a movable lens so that a tilt amount of a focal plane in an optical system changes, according to a change in at least one of the information about the distances and a position of one of the plurality of feature points within an imaging area. An image pickup apparatus having the above control apparatus also constitutes another aspect of the disclosure. A focal plane control method corresponding to the above control apparatus also constitutes another aspect of the disclosure.

A lens apparatus according to another aspect of the disclosure includes an optical system, and a processor configured to control driving of a movable lens in the optical system so that a tilt amount of a focal plane in the optical system changes. The processor is configured to acquire information about a plurality of feature points about an object detected from image data obtained by imaging, and distances to a plurality of feature points, and to control driving of the movable lens according to a change in at least one of the information about the distances and a position of one of the plurality of feature points within an imaging area.

Further features of various embodiments of the disclosure will become apparent from the following description of embodiments with reference to the attached drawings.

BRIEF DESCRIPTION OF THE DRAWINGS

FIGS. 5A and 5B illustrate imaging according to Example 1.

FIGS. 6A, 6B, and 6C illustrate imaging illustrated in FIGS. 5A and 5B viewed from a direction orthogonal to a focusing direction.

FIGS. 8A and 8B illustrate imaging according to Example 2.

FIG. 9 illustrates changes in a tilt driving amount during imaging in FIGS. 8A and 8B.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a description will be given of embodiments according to the disclosure.

Figure 1:
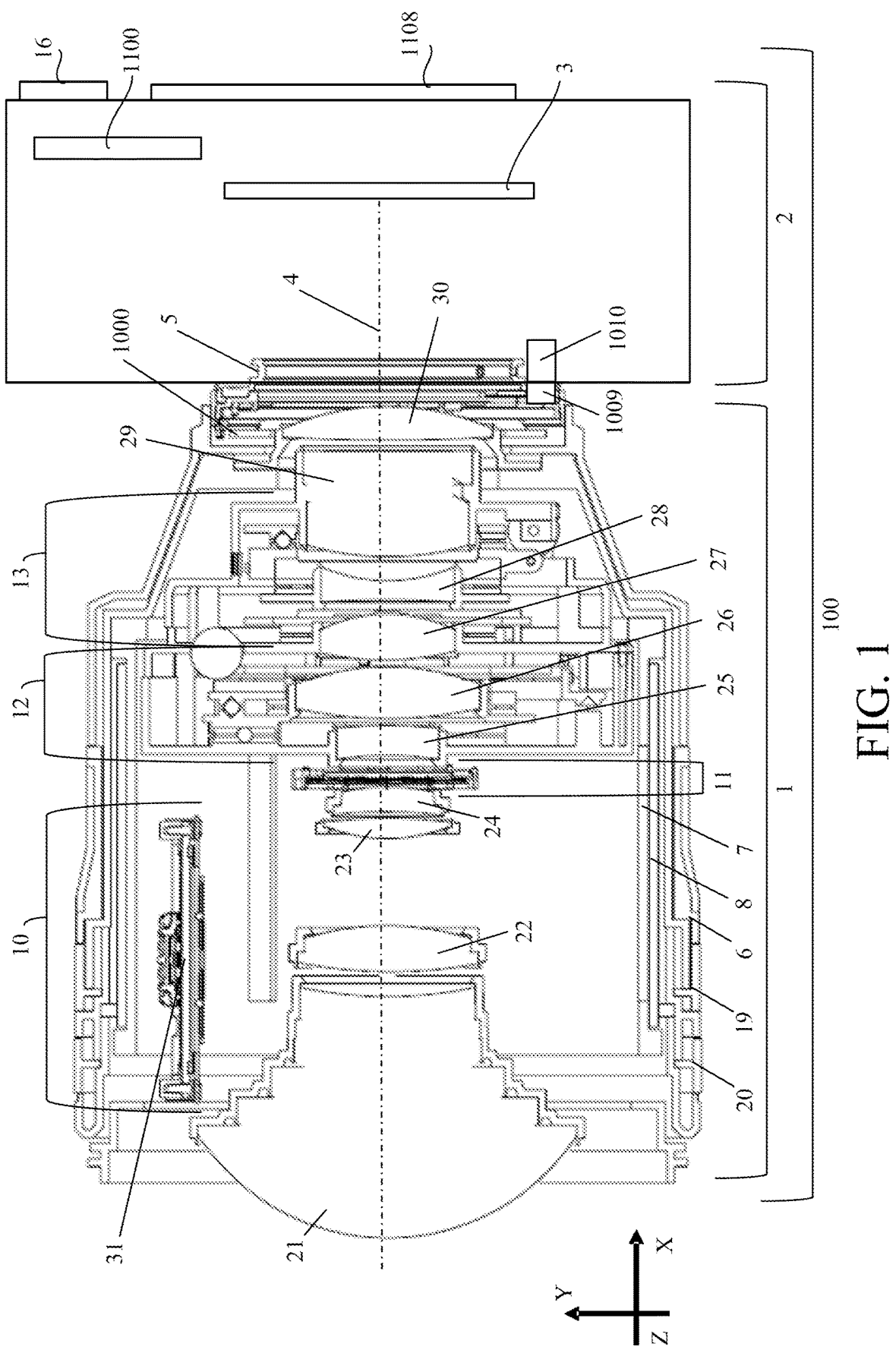
FIG. 1 is a sectional view illustrating the configuration of a camera system according to this embodiment.

FIG. 1 illustrates the configuration of a camera system 100 including a lens unit 1 as a lens apparatus and a camera body 2 as an image pickup apparatus (optical apparatus) according to this embodiment. In FIG. 1, an optical axis 4 of the lens unit 1 is set to an X-axis, a vertical axis is set to a Y-axis, and a horizontal axis (orthogonal to the paper plane of FIG. 1) is set to a Z-axis.

The camera body 2 includes an image sensor 3 as a photoelectric conversion element such as a CCD sensor or a CMOS sensor. The image sensor 3 photoelectrically converts (captures) an optical image formed by the optical system within the lens unit 1. The camera body 2 generates image data from an imaging signal as an electrical signal output from the image sensor 3, and displays the image data on a rear display unit 1108 or an intra-finder display unit 1100, or records it on an image recorder to be described below. Viewing an image displayed on the rear display unit 1108 or an image displayed on the intra-finder display unit 1100 and observable through an eyepiece unit 16, the user can confirm an imaging composition and an object state.

The lens unit 1 includes an optical system that includes, in order from the object side, a first (unit) lens 21, a second (unit) lens 22, a third (unit) lens 23, a fourth (unit) lens 24, a fifth (unit) lens 25, a sixth (unit) lens 26, a seventh (unit) lens 27, and an eighth (unit) lens 28, a ninth (unit) lens 29, and a tenth (unit) lens 30. The focal length of the optical system can be changed (that is, zooming can be performed) by changing a positional relationship (distance) of these lenses 21 to 30 in the optical axis direction as a direction along the optical axis 4. The optical system also includes an aperture stop 11 that changes a diameter of an aperture through which light passes.

Among these lenses 21 to 30, a movable lens that is movable in the optical axis direction is held by a holding frame having a cam follower. The cam follower is engaged with a linear groove portion formed in a guide barrel 7 so as to extend in the optical axis direction and a cam groove portion formed in a cam barrel 8 so as to have a tilt in the optical axis direction. In a case where a zoom operation ring 6 is rotated by the user, the cam barrel 8 is rotated around the optical axis 4 and the movable lens moves in the optical axis direction. Thereby, zooming is performed. The rotational operation amount of the zoom operation ring 6 is detected by a zoom operation rotation detector, which will be described below.

The second lens 22 is a focus lens (focusing element) movable in the optical axis direction and provides focusing. The second lens 22 is guided in the optical axis direction by an unillustrated guide bar and driven in the optical axis direction by a focus actuator 31 including a vibration type linear motor. A focus unit 10 including the second lens 22 and the focus actuator 31 has an unillustrated focus position sensor that detects the position (focus position) of the second lens 22 in the optical axis direction.

The sixth lens 26 and the eighth lens 28 can be moved (shifted) in a shift direction that is orthogonal to the optical axis 4. Shifting the sixth lens 26 and the eighth lens 28 can provide a tilt effect that tilts the focal plane as a surface on the object side where the optical system is focused on the imaging plane of the image sensor 3 (a surface orthogonal to the optical axis 4), and a shift effect that moves the imaging range. More specifically, the sixth lens 26 and the eighth lens 28 both have positive refractive powers or both have negative refractive powers. Shifting them in opposite directions can provide the tilt effect, and shifting them in the same direction can provide the shift effect. In addition, in a case where the sixth lens 26 and the eighth lens 28 have refractive powers with different signs, shifting them in opposite directions can provide the shift effect, and shifting them in the same direction can provide the tilt effect.

The sixth lens 26 is held by a holding frame that can be shifted in the shift direction, and is driven in the shift direction by a first shift unit 12 that includes a shift actuator such as a voice coil motor. The eighth lens 28 is held by a holding frame that can be shifted in the shift direction, and is driven in the shift direction by a second shift unit 13 including a shift actuator such as a voice coil motor.

The lens unit 1 is removably attached to the camera body 2 via the mount 5. The lens unit 1 and the camera body 2 have a lens contact 1009 and a camera contact 1010 for communicating with each other.

Figure 2:
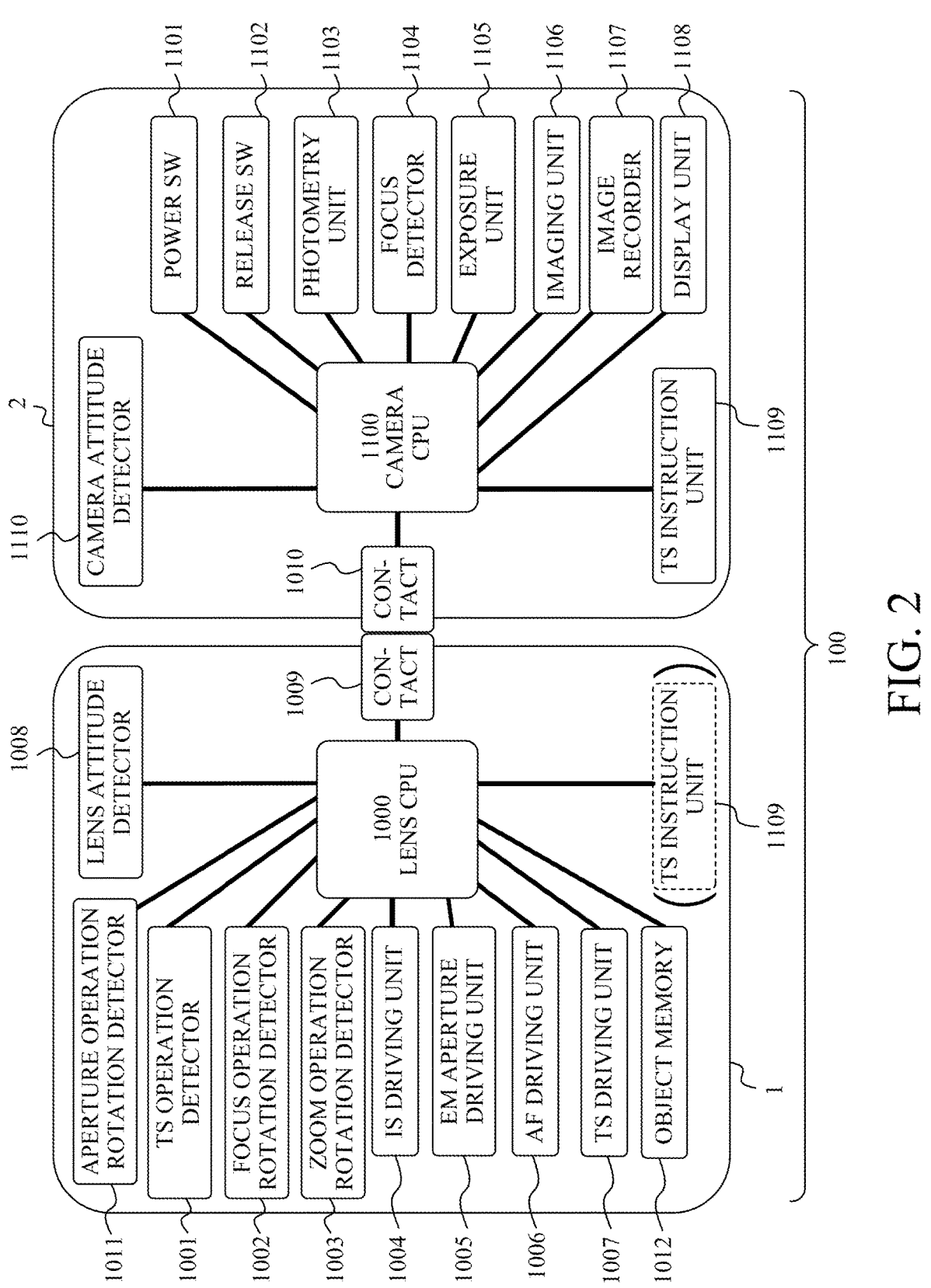
FIG. 2 is a block diagram illustrating the electrical configuration of a lens unit and a camera body according to this embodiment.

FIG. 2 illustrates the electrical configuration of the lens unit 1 and camera body 2. In the camera body 2, a camera CPU 1100 (control apparatus) includes a microcomputer. The camera CPU 1100 controls the operation of each component within the camera body 2. The camera CPU 1100 communicates with a lens CPU 1000 in the lens unit 1 via the camera contact 1010 described above.

Camera information that the camera CPU 1100 sends to the lens CPU 1000 includes driving amount information about the second lens 22, focus information about the optical system, and attitude (or orientation) information about the camera body 2 based on a signal from a camera attitude (or orientation) detector 1110 such as an acceleration sensor. The camera information further includes distance information to an object to be focused on and shift information on an imaging range, which the user indicates through the operation of a tilt/shift (TS) instruction unit 1109. Details of the TS instruction unit 1109 will be described below.

Lens information sent from the lens CPU 1000 to the camera CPU 1100 includes optical information such as imaging magnification of the optical system, and information about lens functions such as zoom and image stabilization. The lens information further includes attitude information about the lens unit 1 based on a signal from a lens attitude detector 1008 such as a gyro sensor or an acceleration sensor.

The lens contact 1009 and the camera contact 1010 also include a contact for supplying power from the camera body 2 to the lens unit 1.

A power switch 1101 is operated by the user to start the camera CPU 1100 and start supplying power to actuators, sensors, etc. in the camera system 100. A release switch 1102 includes a first stroke switch SW1 that is turned on in a case where the user half-presses the switch, and a second stroke switch SW2 that turns on in a case where the user fully presses the switch. The camera CPU 1100 performs an imaging preparation operation including object luminance measurement by a photometry unit 1103 and focus detection by a focus detector 1104 in response to input of the turning-on signal from the first stroke switch SW1.

The camera CPU 1100 calculates an F-number (aperture value) of the aperture stop 11 and an exposure amount (shutter speed) of the image sensor 3 included in the imaging unit 1106 based on the photometry result by the photometry unit 1103. The camera CPU 1100 controls a driving amount (including a driving direction) of the second lens 22 for focusing on an object based on focus information (defocus amount and direction) which is the detection result of the focus state of the optical system by the focus detector 1104. The driving amount information about the second lens 22 is transmitted to the lens CPU 1000. The lens CPU 1000 controls an AF driving unit 1006 (including the focus actuator 31 described above), which will be described below, based on the received driving amount information, to drive the second lens 22 in the optical axis direction. Thereby, autofocus (AF) is performed.

The camera CPU 1100 as a detector detects one or more objects from the image data obtained through the image sensor 3. The camera CPU 1100 as an acquiring unit acquires information for focusing on each object. More specifically, information about the distance to the object at each point on the image sensor 3, that is, information about a distance and a focus shifts amount, or the in-focus degree, is acquired. Since the focus shift amount and the in-focus degree Change according to the distance to the object, they are included in the information about the distance. The camera CPU 1100 can detect feature points about the object from the image data, and acquire information about the positions of the feature points on the image sensor 3 (within the image data) and the distances of the feature points (distances, focus shift amounts, etc.).

The camera CPU 1100 as a control unit calculates a tilt driving amount for focusing on an object instructed through the TS instruction unit 1109, and calculates a shift driving amount for changing from a current imaging range to an imaging range instructed through the TS instruction unit 1109. The tilt driving amount information and shift driving amount information are transmitted from the camera CPU 1100 to the lens CPU 1000. The lens CPU 1000 controls the first shift unit 12 and the second shift unit 13 through a TS driving unit 1007, which will be described below, based on tilt driving amount information and shift driving amount information. Thereby, the sixth lens 26 and the eighth lens 28 are shifted.

The TS instruction unit 1109 may instruct a plurality of objects. Even if a plurality of objects are located at different distances from the camera system 100, they may be in focus as long as they are located on the same focal plane tilted by the tilt effect. Details of imaging using such a tilt effect will be described below.

As parenthesized in FIG. 2, the TS instruction unit may be provided to the lens unit 1. In this case, the function of the TS instruction unit can be assigned to an existing operation unit such as a dial or button provided on the lens unit 1.

The camera CPU 1100 instructs the lens CPU 1000 to eccentrically drive (shift) an unillustrated image stabilizing lens for image stabilization in a predetermined imaging mode. The lens CPU 1000 controls the shift driving of the image stabilizing lens through an image stabilization (IS) driving unit 1004, which will be described below.

The camera CPU 1100, which has received the turning-on signal from the second stroke switch SW2, sends an aperture driving command to the lens CPU 1000. The lens CPU 1000 sets the aperture stop 11 to the F-number calculated by the camera CPU 1100 through an electromagnetic aperture driving unit 1005, which will be described below, according to the received aperture driving command. The camera CPU 1100 sends an exposure start command to the exposure unit 1105, and instructs the exposure unit 1105 to retract an unillustrated mirror, if any, and to open an unillustrated shutter. Then, the camera CPU 1100 causes the image sensor 3 of the imaging unit 1106 to capture an object image. A signal processing unit within the camera CPU 1100 digitally converts the analog imaging signal from the image sensor 3, and further performs various image processing for the digital imaging signal to generate image data of a moving image or a still image. Image data is recorded on a recording medium, such as a semiconductor memory such as a flash memory, a magnetic disk, and an optical disc, in an image recorder 1107.

The display image data generated by the image processing unit before the tuning-on signal from the second stroke switch SW2 is input is displayed as a live-view image on the display unit 1108, such as a liquid crystal, an organic EL, etc. The user who has viewed the live-view image can select an object to be focused or instruct a shift in an imaging composition (imaging angle of view) by operating the TS instruction unit 1109. The TS instruction unit 1109 may be configured on the display unit 1108 including a touch sensor.

In the lens unit 1, a focus operation rotation detector 1002 detects the rotational operation amount of the focus operation ring 19 illustrated in FIG. 1. An aperture operation rotation detector 1011 detects the rotational operation amount of an aperture operation ring 20 illustrated in FIG. 1. The zoom operation rotation detector 1003 detects the rotational operation amount of the zoom operation ring 6 as described above.

An object memory 1012 stores a spatial position in the imaging range of the object instructed through the TS instruction unit 1109 or the display unit 1108. This position can be defined by the distance to the object and coordinates (X, Y) in a case where the imaging plane is expressed on the XY plane. The details will be described below.

The TS operation detector 1001 performs a manual operation unit to obtain tilt and shift effects, and a sensor that detects the manual operation amount.

The IS driving unit 1004 includes an image stabilizing actuator that shifts the image stabilizing lens described above and a driving circuit thereof.

The AF driving unit 1006 includes the focus unit 10 (focus actuator 31) that drives the second lens 22 in the optical axis direction and its driving circuit. The lens CPU 1000 controls the AF driving unit 1006 to move the second lens 22 according to driving amount information from the camera CPU 1100 or rotational operation amount from the focus operation rotation detector 1002.

The electromagnetic aperture driving unit 1005 includes an aperture actuator that drives the aperture stop 11 and its driving circuit. The lens CPU 1000 receives an aperture driving command from the camera CPU 1100, controls the electromagnetic aperture driving unit 1005, and operates the aperture stop 11 to an F-number determined by the camera CPU 1100 or specified by the user.

The TS driving unit 1007 includes the first shift unit 12 and second shift unit 13 illustrated in FIG. 1 and their driving circuits. The lens CPU 1000 controls the TS driving unit 1007 based on the tilt driving amount information and shift driving amount information received from the camera CPU 1100 or in accordance with the operation of the TS operation detector 1001, and controls the sixth lens 26 and the eighth lens 28. Shifting the sixth lens 26 and the eighth lens 28 can provide a tilt effect that tilts the focal plane relative to a plane orthogonal to the optical axis 4, and a shift effect that shifts the imaging range.

This embodiment performs focusing by shifting the sixth lens 26 and the eighth lens 28 using the TS driving unit 1007 and by moving the second lens 22 in the optical axis direction using the AF driving unit 1006. The optical system has an optical characteristic in which the focus changes even if the object distance does not change due to the shifting of the sixth lens 26 and the eighth lens 28, and the TS driving unit 1007 and AF driving unit 1006 are properly controlled according to this characteristic.

An unillustrated angular shake sensor including a gyro sensor is provided in the lens unit 1, and the angular shake sensor is electrically connected to the lens CPU 1000. The angular shake sensor detects the respective angular velocities of vertical (pitch) shake and horizontal (yaw) shake, which are angular shakes of the lens unit 1, and outputs angular velocity signals to the lens CPU 1000. The lens CPU 1000 electrically or mechanically integrates the angular velocity signals of pitch and yaw shakes from the gyro sensor and calculates the pitch and yaw shakes amounts. Then, the lens CPU 1000 controls the IS driving unit 1004 based on the pitch shake amount and the yaw shake amount to shift and drives the image stabilizing lens, thereby correcting image blurs caused by the angular shakes. An acceleration sensor may be used as the angular shake sensor instead of the gyro sensor.

An unillustrated focus shake sensor including an acceleration sensor is provided within the lens unit 1, and electrically connected to the lens CPU 1000. The focus shake sensor detects the acceleration of focus shake, which is shake in the optical axis direction of the lens unit 1, and outputs an acceleration signal to the lens CPU 1000. The lens CPU 1000 electrically or mechanically integrates the acceleration signal and calculates the focus shake amount. Then, the lens CPU 1000 controls the AF driving unit 1006 based on the focus shake amount to drive the second lens 22 in the optical axis direction, thereby correcting image blurs caused by the focus shake. The angular shake sensor and focus shake sensor may be provided in the camera body 2, and the lens CPU 1000 may receive the angular shake amount and the focus shake amount through the camera CPU 1100.

The lens CPU 1000 controls the TS driving unit 1007 based on the angular shake amount of the lens unit 1 calculated based on the output from the angular shake sensor. For example, in a case where camera shake occurs while the user holds the camera system 100 with his hand and captures an image, the focal plane shifts from the object. At this time, the lens CPU 1000 controls the TS driving unit 1007 based on the object position stored in the object memory 1012 so as to keep the focal plane on the object while correcting camera shake. Details of this control will be described below.

Figures 3A, 3B, 3C:
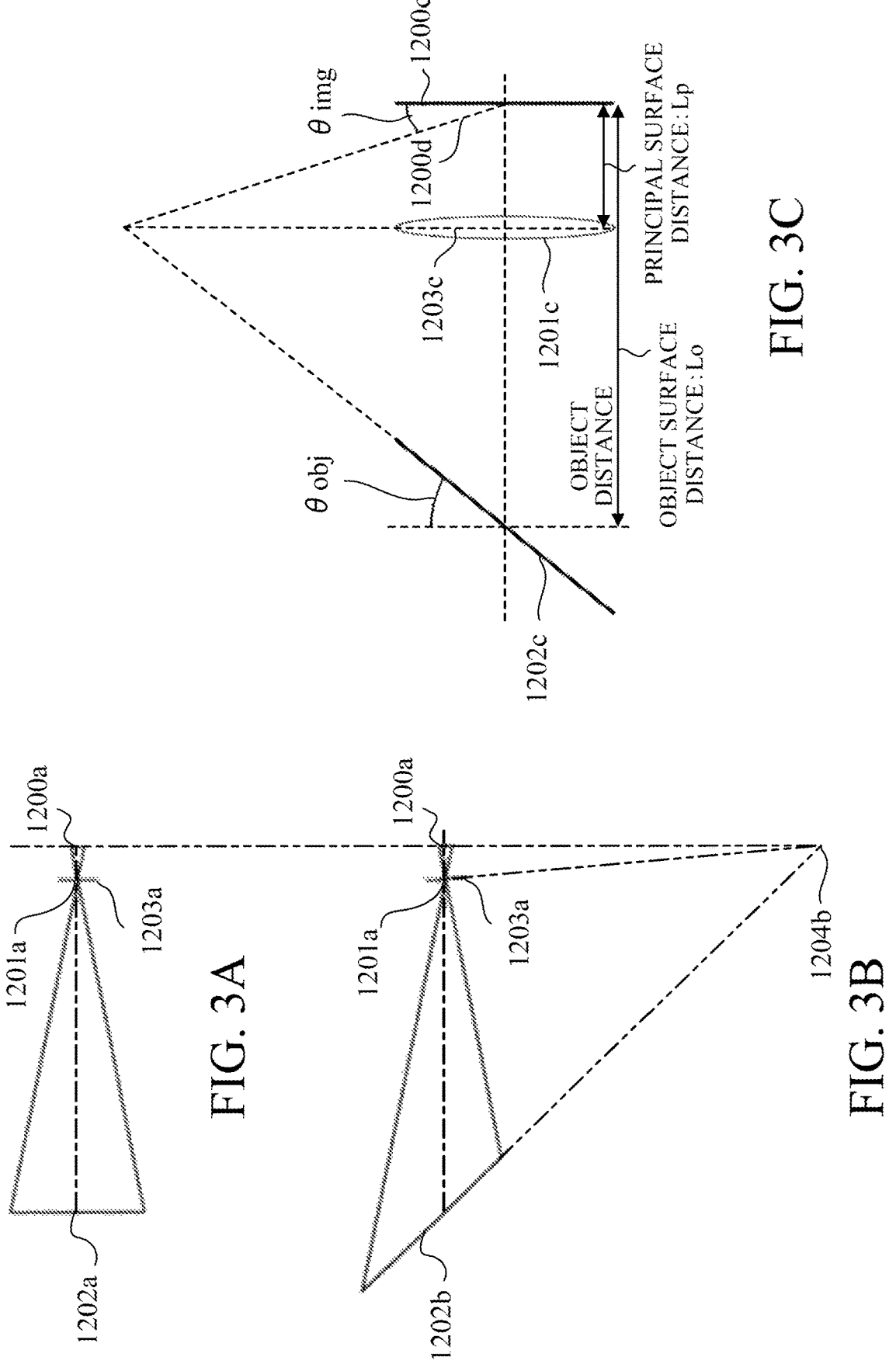
FIGS. 3A, 3B, and 3C explain the Scheimpflug principle.

Referring now to FIGS. 3A, 3B, and 3C, the Scheimpflug principle will be described. In a case where the principal plane of the optical system is tilted (not parallel) to the imaging plane of the image sensor 3, the Scheimpflug principle determines a range that is in focus on the object side (referred to as an in-focus range hereinafter). FIG. 3A illustrates a focal plane 1202a that is in focus in a case where a principal surface 1203a of the optical system 1201a is not tilted relative to an imaging plane 1200a. FIG. 3B illustrates the focal plane 1202b that is in focus in a case where the principal surface 1203a is tilted relative to the imaging plane 1200a. According to the Scheimpflug principle, as illustrated in FIG. 3B, in a case where the imaging plane 1200a and the principal surface 1203a of the optical system 1201a intersect at a point 1204b on a straight line, the focal plane 1202b also passes through the point 1204b.

In a case where the object to be imaged has a depth when viewed from the camera system, tilting the focal plane 1202b in the depth direction can provide an in-focus state from the front to the back of the object. A lens unit that has no TS mechanism narrows the aperture stop to deepen the depth of field in expanding the in-focus range in the depth direction. On the other hand, a lens unit having a TS mechanism can expand the in-focus range in the depth direction by tilting the principal surface 1203a relative to the imaging plane 1200a using the TS mechanism, even in the fully open (maximum) aperture state.

Conversely, tilting the principal plane of the optical system in the opposite direction to the tilt of a deep object can also make the focal plane intersect the depth direction of the object at an angle close to a right angle. In this case, since the in-focus range in the depth direction can be extremely narrowed, a diorama-like captured image can be obtained.

However, this embodiment generates a tilt angle θobj relative to the imaging plane 1200c on the focal plane 1202c using the image plane tilt caused by the lens shifting (decentering) in the optical system 1201c as illustrated in FIG. 3C, instead of tilting the principal surface of the optical system relative to the imaging plane. However, in a case where the Scheimpflug principle is applied to the principal surface 1203c and focal plane 1202c of the optical system 1201c, an image plane tilt of an angle θimg occurs on an image plane 1200d. In this embodiment, the optical system 1201c corrects this image plane tilt angle θimg so as to expand the in-focus range in the depth direction by tilting the focal plane 1202c without tilting the imaging plane 1200c.

In FIG. 3C, a distance in the optical axis direction between the principal surface 1203c of the optical system 1201c and the imaging plane 1200c will be referred to as a principal plane distance Lp, and a distance in the optical axis direction between the focal plane 1202c and the imaging plane 1200c will be referred to as an object distance (object surface distance) Lo.

On the other hand, in an attempt to secure the image plane tilt correction effect, the shift amount of the lens in the optical system 1201c increases, and the shift in the imaging composition increases. Thus, this embodiment suppresses the shift in the imaging composition by shifting another lens designed to reduce aberration fluctuations during shifting, while securing the image plane tilt correction effect. This embodiment shifts the sixth lens 26 and the eighth lens 28 as these two lenses.

Example 1

Figure 4:
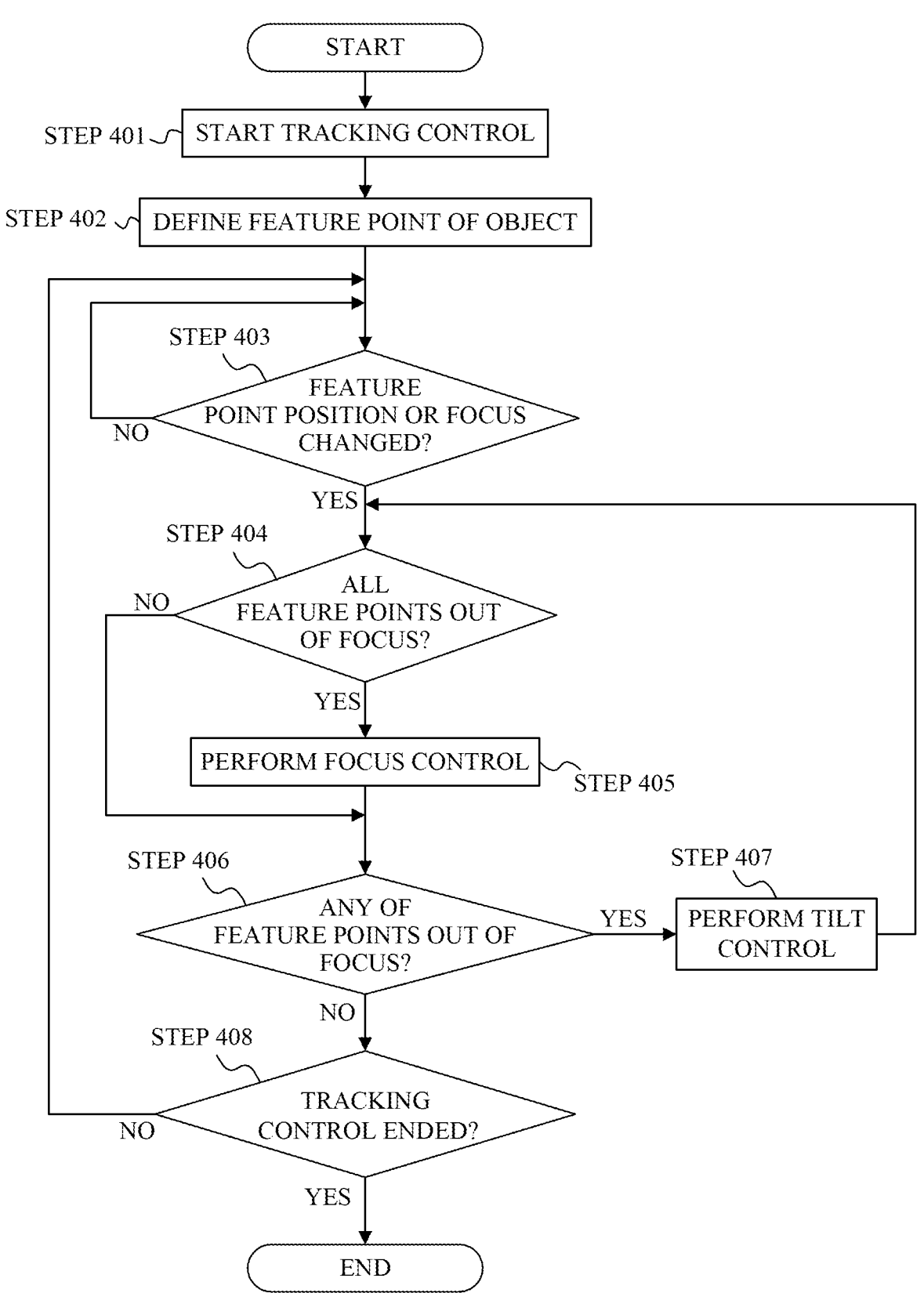
FIG. 4 is a flowchart illustrating processing according to Example 1.

Example 1 performs tracking control to control the in-focus range to include a single moving object. A flowchart in FIG. 4 illustrates this tracking control processing (focal plane control method) according to Example 1. The camera CPU 1100 executes this processing according to a computer program.

In a case where the user selects a tracking mode for tracking and focusing on the object, the camera CPU 1100 starts tracking control in step 401. At this time, the user selects the object to be imaged through the operation of the TS instruction unit 1109 and determines the desired tilt angle.

In step 402, the camera CPU 1100 defines a plurality of feature points of the object from the image data obtained through the image sensor 3. This embodiment defines two feature points for a single object. A method for defining the feature points will be described below.

In step 403, the camera CPU 1100 determines whether at least one of the position (i.e., the imaging composition) of any feature point and the focus state (i.e., information about distance such as distance and focus shift amount) has changed in the image data. In a case where the camera CPU 1100 determines that at least one of the positional relationship among the feature points and the focus state has changed, the camera CPU 1100 performs the processing of step 404, and in a case where it determines that it has not yet changed, the camera CPU 1100 repeats this determination.

In step 404, the camera CPU 1100 determines whether all (two) feature points are out of focus. In a case where all the feature points are out of focus, the camera CPU 1100 performs the processing of step 405, and in a case where any of the feature points is in focus, the camera CPU 1100 performs the processing of step 406.

In step 405, the camera CPU 1100 performs focus control to perform AF by moving the second lens 22 so as to focus on at least one feature point. At this time, the camera CPU 1100 can determine whether each feature point is located near or far from the focal plane. Thus, focus control is performed, for example, by calculating the driving direction and driving amount of the second lens 22 to focus on a feature point closer to the focal plane, and by transmitting this information to the lens CPU 1000.

In step 406, the camera CPU 1100 determines whether any one of the feature points is out of focus. The camera CPU 1100 performs the processing of step 407 in a case where at least one feature point is out of focus, and performs the processing of step 408 in a case where all feature points are in focus.

In step 407, the camera CPU 1100 performs tilt control to shift the sixth lens 26 and the eighth lens 28 so as to bring the out-of-focus feature point into focus. At this time, the camera CPU 1100 can determine whether the out-of-focus feature point is close to or far from the focal plane, so the direction and amount (angle) of tilting the focal plane to bring the out-of-focus feature point into focus and sends the information to the lens CPU 1000. After the camera CPU 1100 performs this tilt control in this manner, the flow returns to step 404.

By performing this tilt control, even if the previously focused feature point goes out of focus, it can be brought into focus using the focus control described above, and by repeating the tilt control and focus control, all feature points can be brought into focus.

In step 408, the camera CPU 1100 determines whether or not there is an instruction from the user to end the tracking control. In a case where there is no end instruction, the flow returns to step 403, and in a case where there is the end instruction, the flow ends.

FIGS. 5A and 5B illustrate an example of tracking control according to Example 1. FIG. 5A illustrates an optical image including one object (person) 2101 formed on the image sensor 3, and the user has selected the object 2101. The tracking control is performed from this state. In the optical image, an in-focus area extends in a horizontal direction 2102 parallel to the long side of the image sensor 3, which is instructed by the user. A range in the vertical direction between lines 2103 and 2104 indicates the in-focus range, and in this example, the range in the short side direction of the image sensor 3 that includes the object 2101 from its head to its feet is the in-focus range. The user attempts to capture an image that is in focus in the horizontal direction 2102 and is blurred elsewhere.

FIG. 6A illustrates the state illustrated in FIG. 5A viewed from a direction orthogonal to the horizontal direction 2102. A focal plane 2105 having a tilt amount 2109 relative to a plane orthogonal to the optical axis can focus on the range including the head to the feet of the object 2101, and blur other parts. At this time, the closest point on the camera system side of the focal plane 2105 among the object 2101 captured on the image sensor 3 is defined (set) as a first feature point 2106, and the farthest point on the opposite side of the focal plane 2105 to the camera system is defined (set) as a second feature point 2107. The camera CPU 1100 can set each feature point by detecting the face of the object or detecting a focus range from the image data. A depth of field 2108 based on the focal plane 2105 is determined from an object distance, the focal length of the optical system, the F-number (aperture value) of the optical system, and the permissible circle of confusion of the optical system, and both the first feature point 2106 and the second feature point 2107 are within the depth of field 2108.

FIGS. 5B and 6B illustrate the object 2101 that has moved toward (approached) the camera system from the state illustrated in FIGS. 5A and 6A. As illustrated in FIG. 5B, the post-movement object 2101 appears larger on the image sensor 3 than the pre-movement object 2101. At this time, as illustrated in FIG. 6B, even if focus control is performed on the object 2101 in step 405 of FIG. 4, the depth of field 2108' becomes shallow because the object distance becomes shorter due to the movement. As a result, the first feature point 2106 and the second feature point 2107 may be out of focus.

In such a case, as illustrated in FIG. 6C, tilt control is performed in step 407 of FIG. 4 so that a tilt amount of the focal plane 2105 becomes a tilt amount 2109'' smaller than a tilt amount 2109. Thereby, a depth of field 2108'' becomes deeper, and the first feature point 2106 and second feature point 2107 can be brought into the in-focus range. That is, in a case where the in-focus range of the optical system for a moving object becomes smaller, the in-focus range is widened by reducing the tilt amount of the focal plane.

As for the tilt control at this time, since the user has first decided to focus in the horizontal direction 2102 illustrated in FIG. 5A, the tilt direction of the focal plane 2105 is a direction around the axis along the horizontal direction 2102. Thereby, the in-focus range for the post-movement object 2101 can be changed without changing the in-focus direction.

Next, from the positional relationship between the focal plane 2105 and the post-movement first feature point 2106 and second feature point 2107, it is determined in which direction (tilt direction) the tilt amount of the focal plane 2105 is to be changed. As illustrated in FIG. 6C, by determining the tilt direction so that the tilt amount 2109'' becomes smaller than that before the object 2101 moves and by performing the tilt control, both the post-movement first feature point 2106 and the second feature point 2107 can be brought into the in-focus range.

On the other hand, the focus control uses known servo focus control using the first feature point 2106 as the main feature point. Performing servo focus control as the object 2101 moves and performing the above tilt control so as to change the tilt amount by a unit tilt amount can maintain the in-focus state of the first feature point 2106 and the second feature point 2107.

This example can perform imaging while maintaining the in-focus state of a plurality of feature points of at least one moving object.

In this example, the tilt direction is the direction around the axis along the horizontal direction 2102, but the tilt direction is not limited to this example, and can be the direction instructed by the user or the direction around the axis calculated from the object.

Example 2

Figure 7:
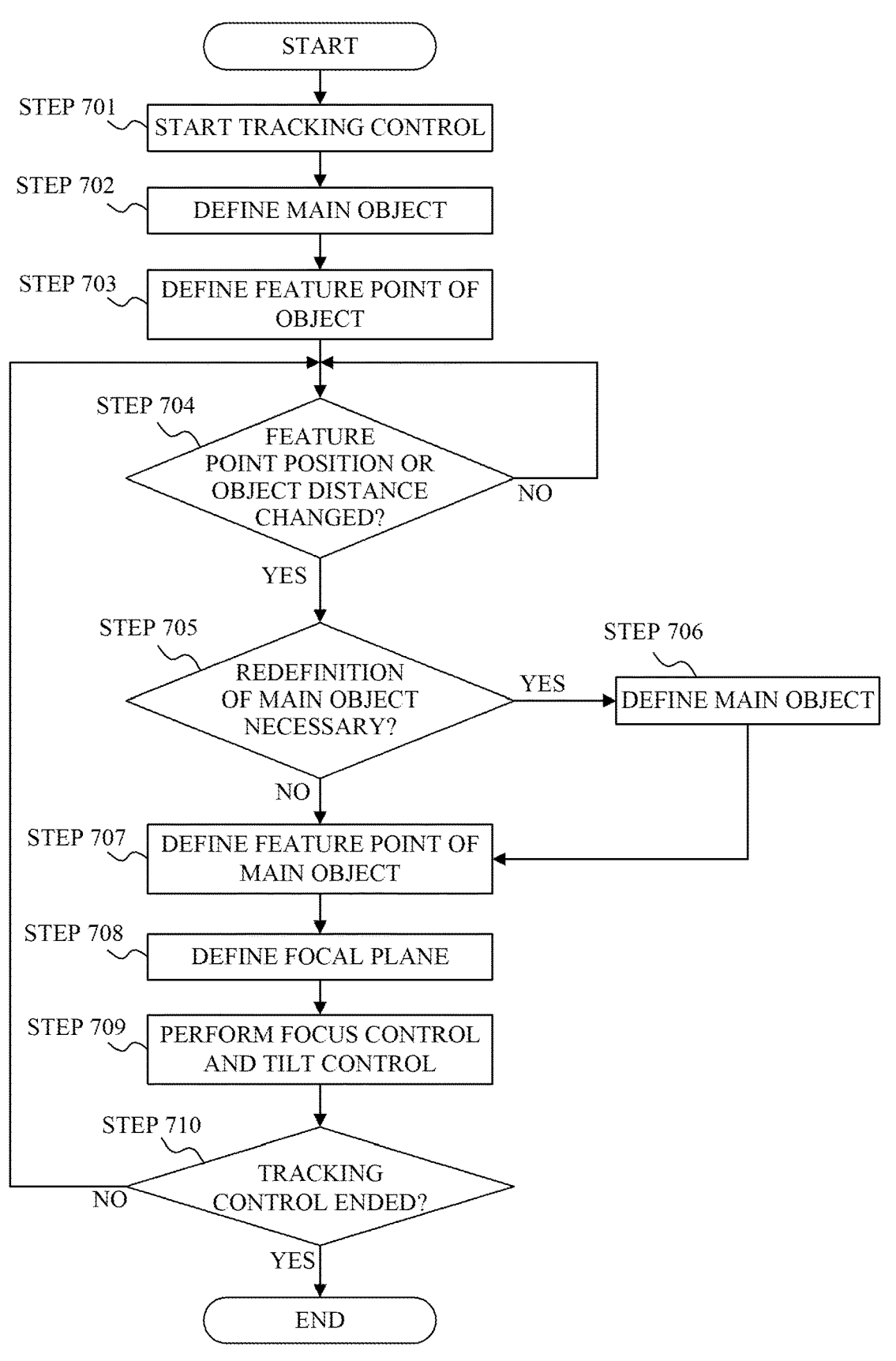
FIG. 7 is a flowchart illustrating processing according to Example 2.

Example 2 performs tracking control to control the in-focus range to include two moving objects. A flowchart in FIG. 7 illustrates this tracking control processing (focal plane control method) according to Example 2. The camera CPU 1100 executes this processing according to a computer program.

In a case where the user selects a tracking mode for tracking and focusing on an object, the camera CPU 1100 starts tracking control in step 701. At this time, the user selects the object to be imaged by operating the TS instruction unit 1109 and determines a desired tilt angle.

In step 702, the camera CPU 1100 defines an object from the image data obtained through the image sensor 3. This example defines (determines) a main object as a main imaging target of two objects from an in-focus area of the object, optical information, and object distance. The object distance is a distance from the image sensor 3 to an object in a normal direction (optical axis direction) of the image sensor 3 on the spatial coordinates. The object distance can be calculated from a phase difference detected by the focus detector 1104, a distance on the optical axis, the tilt amount of the focal plane determined from Scheimpflug principle, the focal length of the optical system, and the spatial coordinates detected from the position on the image sensor 3. As described above, as the object distance becomes shorter, the depth of field becomes shallower, and as the object distance becomes longer, the depth of field becomes deeper. In a case where the focal plane is tilted, as the object becomes larger, it becomes more difficult to bring the object into the depth of field. Therefore, by calculating the ease (likelihood) with which an object can enter the depth of field from the object distance and the recognized object size, and by defining the object that is the most difficult to enter the depth of field as the main object, a sub object that is not defined as the main object can be brought into the in-focus range.

In a case where the focal length is sufficiently larger (longer) than the object distance, it can be approximated that the depth of field is proportional to the object distance, so this example can determine the main object by comparing divided values obtained by dividing object sizes in the spatial coordinates by the object distances. At this time, it becomes more difficult to include the entire object within the depth of field as its divided value becomes larger, and thus the object with the largest divided value is defined as the main object.

The main object may be defined as an object selected by the user, an object that matches a previously registered pattern (such as a person and animal), or the closest object.

In step 703, the camera CPU 1100 defines (sets) feature points of the object from the image data obtained through the image sensor 3. This example defines two feature points for the main object and one feature point for the sub object.

In step 704, the camera CPU 1100 determines whether at least one of the position of any feature point and the object distance (information about distance) has changed. In a case where the camera CPU 1100 determines that one of the feature point position and object distance has changed, the camera CPU 1100 performs the processing in step 705, and in a case where the camera CPU 1100 determines that one of the feature point position and object distance has not changed, the camera CPU 1100 repeats this determination.

In step 705, the camera CPU 1100 determines whether the main object needs to be redefined. More specifically, using the divided value described in step 702, it is determined whether there is an object whose divided value is larger than that of the main object. In other words, it is determined whether there is an object that is more difficult to include within the depth of field than the main object. In a case where there is no object with a larger divided value than the main object, the camera CPU 1100 performs the processing in step 707, and in a case where there is an object with a larger divided value than that of the main object, the camera CPU 1100 defines the main object in step 706 in the same way as step 702. Then, the processing of step 707 is performed.

In step 707, the camera CPU 1100 defines feature points similarly to step 703.

In step 708, the camera CPU 1100 defines a focal plane. More specifically, the camera CPU 1100 defines as the focal plane a plane formed by connecting three points on the spatial coordinates corresponding to two feature points of the main object and one feature point of the sub object. At this time, in a case where the main object and the sub object have the same shape on the spatial coordinates, guaranteeing the in-focus range for the main object can similarly guarantee the in-focus range for the sub object. In other words, applying the focal plane of the actual optical system to the defined focal plane enables imaging to continue without changing the in-focus range for the main object and sub object.

After the focal plane is thus defined, in step 709, the camera CPU 1100 performs focus control and tilt control to accord the focal plane of the actual optical system with the defined focal plane. First, the camera CPU 1100 calculates the pre-control focal plane from the focus position, tilt direction, and tilt amount of the optical system before the focus control and tilt control are performed. Then, the camera CPU 1100 calculates the driving direction and driving amount of the focus unit 10 and the first and second shift units 12 and 13 necessary to accord the pre-control focal plane with the defined focal plane, and performs the focus control and tilt control using these driving amounts. Thereby, two feature points of the main object and one feature point of the sub object can be in focus.

In step 710, the camera CPU 1100 determines whether there is an instruction from the user to end the tracking control, and in a case where there is no end instruction, the flow returns to step 704, and in a case where there is the end instruction, this flow ends.

FIGS. 8A and 8B illustrate an example of tracking control according to Example 2. FIG. 8A illustrates a state in which the user has selected two objects (cars) driving on a road, which are captured on the image sensor 3, as a first object 2201 and a second object 2202. Tracking control is performed from this state. The user selects a first selection point 2203 on the first object 2201 and a second selection point 2204 on the second object 2202. Regarding the tilt state, the tilt direction and tilt amount are set so that the horizontal range surrounded by lines 2205 and 2206 on the image sensor 3 is in focus. The lines 2205 and 2206 are almost parallel to the straight line connecting the first selection point 2203 and the second selection point 2204 (indicated by an alternate long and short dash line in FIGS. 8A and 8B), and the first object 2201 and the second object 2202 are in focus. FIG. 8B illustrates the positions and in-focus ranges of the first object 2201 and second object 2202 that have been moved from the state of FIG. 8A.

Referring to FIG. 7 again, a description will be given of the process of tracking control from the state of FIG. 8A to the state of FIG. 8B.

The camera CPU 1100, which has started the tracking control in step 701, defines a main object in step 702. The first object 2201 and the second object 2202 are cars, and their sizes are approximately equal. Therefore, defining an object closer to the camera system as the main object can provide the above effect. Here, the first object 2201 is defined as the main object.

In step 703, the camera CPU 1100 defines feature points. A description will now be given of the processing of defining the first feature point 2207 and second feature point 2208 about the main object. The camera CPU 1100 defines a first selection point 2203 as a first feature point 2207. Next, a range of the first object 2201 is detected. Then, the camera CPU 1100 defines the longest line segment on the image sensor 3 that passes through the first feature point 2207 and an object recognized within the in-focus range as an object axis 2209 on the image sensor 3. At this time, as illustrated in FIG. 8B, a far or near end of the in-focus range of the object on the object axis 2209 on the image sensor 3 is defined as a second feature point 2208. A line connecting the first feature point 2207 and the second feature point 2208 on the spatial coordinates is defined as the object axis. The object axis is an axis that passes through the object and determines the in-focus range for the object. The camera CPU 1100 defines the second selection point 2204 as a third feature point 2210.

In step 704, the camera CPU 1100 determines whether the positions of the first feature point 2207 and the second feature point 2208 defined in step 703 have changed (moved), and performs the processing of step 705 in a case where each feature point has moved as illustrated in FIG. 8B.

In step 705, the camera CPU 1100 determines whether it is necessary to change (redefine) the main object. In this example, since there is no change in the correlation between the object distances of the moved first object 2201 and second object 2202, the main object is not changed.

The processing after step 706 is as described above, so a description thereof will be omitted. Thus, defining the focal plane and performing the focus control and tilt control so that the focal plane of the actual optical system is accorded with the defined focal plane, the first object 2201 and the second object 2202 can be brought into focus. In a scene where two cars are driving on a road, the two cars on the image sensor 3 have the same driving direction. Therefore, guaranteeing the in-focus range for the first object 2201 enables imaging of these objects to continue while the in-focus state of the first object 2201 and the second object 2202 is maintained, and the in-focus range for these objects is not almost changed.

FIG. 9 illustrates changes in tilt direction and tilt amount from the state of FIG. 8A to the state of FIG. 8B. The vertical axis represents the tilt amount in the pitch direction, and the horizontal axis represents the tilt amount in the yaw direction. A point 2212 represents the tilt direction and tilt amount in the state of FIG. 8A. A point 2213 represents the tilt direction and tilt amount in FIG. 8B, and is tilted in the pitch direction while the tilt amount in the yaw direction remains the same. The conventional optical system needs to control the focal plane equally by revolving and tilting, and has difficulty in tracking an object that moves at a high speed. On the other hand, the optical system according to this example can perform tilt control by shifting the lens, and thus easily perform focal plane control even for an object that moves at a high speed.

In this example, the second feature point 2208 is always defined from the range of the first feature point 2207 and the first object 2201, but the second feature point may be defined by tracking changes in the defined second feature point. In that case, in a case where the second feature point is lost, the second feature point may be redefined by performing processing of tracking changes in the second feature point. Similarly, even in a case where the first feature point is lost, the first feature point may be redefined using the same processing. Furthermore, although not used in defining the focal plane, a fourth feature point may be defined for the third feature point in the same way as the second feature point was found from the first feature point. In this case, even if one of the third and fourth feature points is lost, as long as the other feature point is not lost, the one of the feature points can be redefined and the tracking becomes easy.

Example 3

Figure 10:
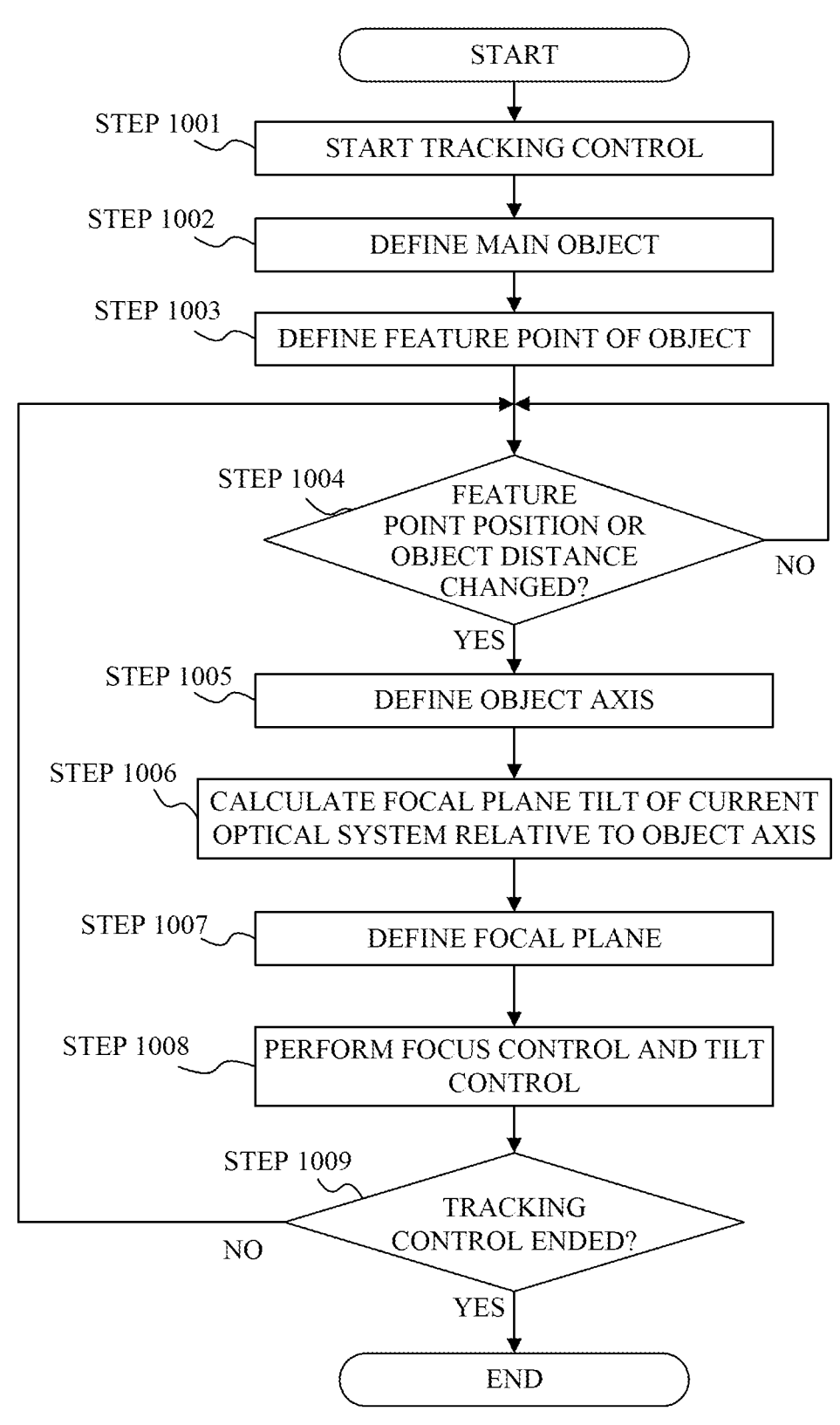
FIG. 10 is a flowchart illustrating processing according to Example 3.

Example 3 performs tracking control to control an in-focus range to include two moving objects. A flowchart in FIG. 10 illustrates this tracking control processing (focal plane control method) according to Example 3. The camera CPU 1100 executes this processing according to a computer program. A description will now be mainly given of processing that is different from the processing according to Example 2 (FIG. 7).

The processing in step 1001 is the same as the processing in step 701 in FIG. 7.

In step 1002, the camera CPU 1100 defines an object from the image data obtained through the image sensor 3. This example defines as the main object an object first selected by the user or an object selected as an imaging target by the user. Also, this example defines another object as a sub object. In this example, the main object is not changed (redefined).

step 1003, the camera CPU 1100 defines one first feature point from the main object and one second feature point from the sub object. At this time, points that are easily recognized from the image data in the main object selected by the user are defined as feature points. For example, the (head)lamps of airplanes and cars, and the eyes of people and animals are the easily recognized points.

The processing in step 1004 is the same as the processing in step 704 in FIG. 7.

In a case where at least one of the feature point position and the object distance changes in step 1004, the camera CPU 1100 defines the object axis in step 1005. More specifically, a line passing through the first feature point and parallel to a direction in which the main object moves is defined as an object axis on the spatial coordinates. Since the user is capturing an image of a moving object, the direction in which the main object moves can be defined on the spatial coordinates from the attitude of the camera system and the movement of the main object on the image sensor 3. For fast-moving objects such as cars, setting the object axis in the direction in which the object moves can capture the moving image.

In step 1006, the camera CPU 1100 calculates the tilt amount of the current focal plane of the optical system relative to the object axis. The tilt amount of the focal plane relative to the object axis is an angle between the focal plane and the object axis in the normal direction of the image sensor 3. In a case where this angle is 0 degrees, the object is in focus in the moving direction of the object. The tilt amount of the current focal plane of the optical system can be calculated by an equation representing the focal plane, which can be calculated from the tilt direction and tilt amount determined by the driving states of the sixth lens 26 and the eighth lens 28, and an equation representing a line on the spatial coordinates extending in the direction in which the object moves. Thus, defining the object axis and tilt amount (angle) is equivalent to define a third feature point different from the first feature point to determine the focal plane where the main object is in focus. Thereby, the main object can be in focus in the direction in which the main object moves.

In step 1007, the camera CPU 1100 defines a focal plane. At this time, the camera CPU 1100 defines an axis from the first feature point and the first angle relative to the object axis, and defines a focal plane using this axis and the second feature point. The in-focus range for the main object is determined by the tilt amount of the focal plane relative to the object axis and the depth of field in a case where the first feature point is in focus.

At this time, in a case where the object distance does not change much or the object is located at a sufficiently distant position, there is almost no change in the depth of field. Therefore, tilt control is performed so as to make constant a tilt amount of the focal plane relative the object axis can approximately maintain the in-focus range for an arbitrary object. Even if an object distance difference between the main object and the sub object is small or their object distances are sufficiently long, the respective depths of field can be approximately equal. At this time, a method of defining the first feature point and the second feature point is the same as step 1005. In other words, in a case where the main object and the sub object are driving in the same direction like a car race, the in-focus range can be maintained even for the sub object.

Example 4

Figure 11:
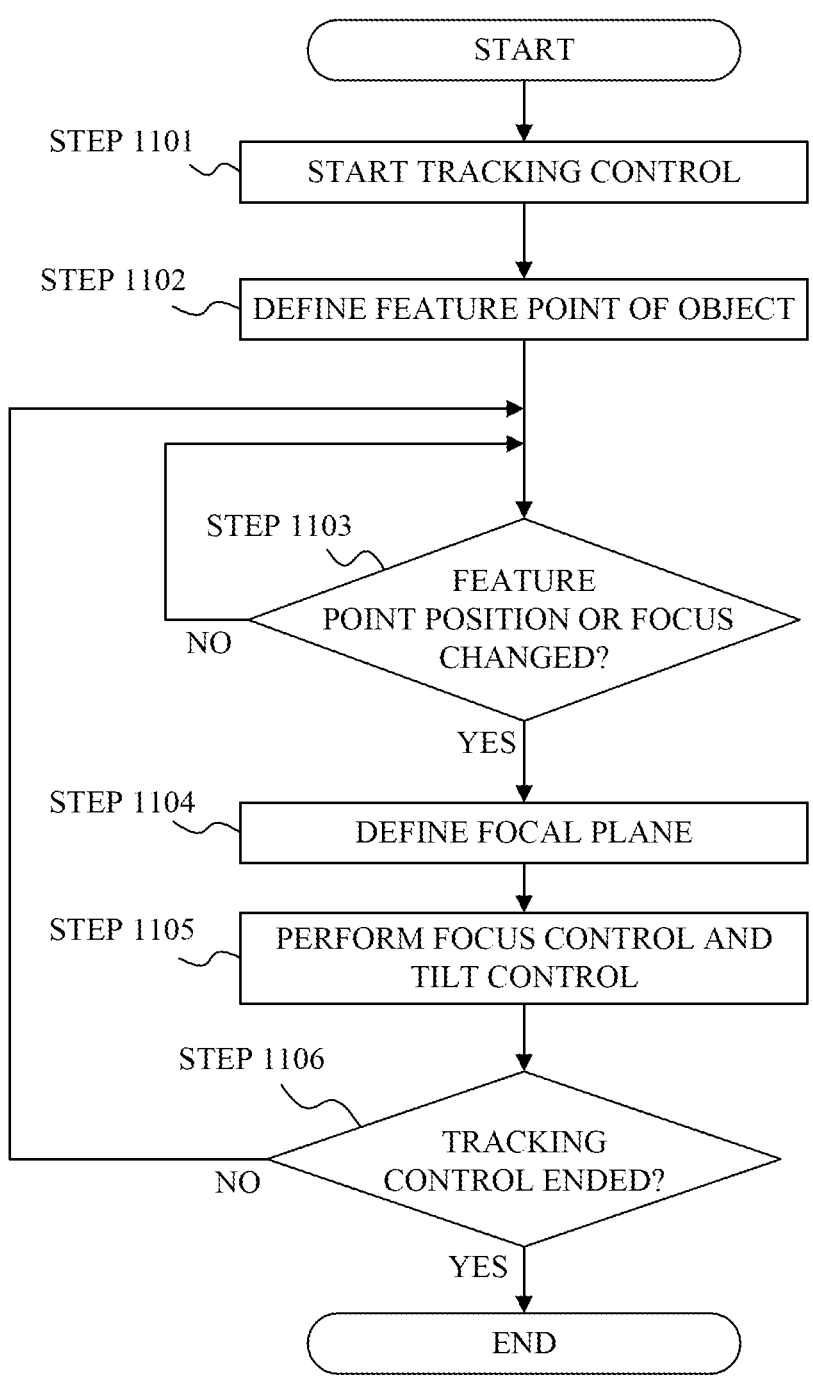
FIG. 11 is a flowchart illustrating processing according to Example 4.

Example 4 performs tracking control to control the in-focus range to include three moving objects. A flowchart in FIG. 11 illustrates this tracking control processing (focal plane control method) according to Example 4. The camera CPU 1100 executes this processing according to a computer program.

In a case where the user selects the tracking mode for tracking and focusing on the object, the camera CPU 1100 starts the tracking control in step 1101. At this time, the user selects the object to be imaged by operating the TS instruction unit 1109 and determines a desired tilt angle.

In step 1102, the camera CPU 1100 defines one feature point for each of the three objects. That is, a total of three feature points are defined. At this time, points that are easily recognized from the image data in the objects selected by the user are defined as feature points. For example, the (head) lamps of airplanes and cars, and the eyes of people and animals are easily recognized points.

In step 1103, the camera CPU 1100 determines whether at least one of the feature point position and the focus state (the focus shift amount or the in-focus degree) has changed in the image data. In a case where the camera CPU 1100 determines that at least one of the feature point position and focus state has changed, the camera CPU 1100 performs the processing in step 1104, and in a case where the camera CPU 1100 determines that at least one of the feature point position and focus state has not changed, the camera CPU 1100 repeats this determination.

In step 1104, the camera CPU 1100 defines a focal plane. More specifically, the focal plane is defined by the three feature points defined in step 1102.

In step 1105, the camera CPU 1100 performs focus control and tilt control to accord the focal plane of the actual optical system with the defined focal plane. First, the camera CPU 1100 calculates the focal plane before the focus control and tilt control are performed from the focus position, tilt direction, and tilt amount of the optical system before the focus control and tilt control are performed. Then, the driving directions and driving amounts of the focus unit 10 and the first and second shift units 12 and 13 necessary to accord the focal plane before the focus control and the tilt control with the defined focal plane are calculated, and the focus control and tilt control are performed using these driving amounts. Thereby, these three feature points can be in focus.

In step 1106, the camera CPU 1100 determines whether there is an instruction from the user to end the tracking control. In a case where there is no instruction to end, the flow returns to step 1103, and in a case where there is the end instruction, this flow ends.

In a case where all three objects are located at sufficiently distant positions for the F-number set by the user and the size of the main object, the depth of field does not change much regardless of the movements of the objects. In such a case, these three objects can be imaged while the in-focus range of these three objects can be maintained. Whether or not the depth of field is sufficient for the three objects from the F-number of the optical system, object size, and object distance when the tracking control is started may be determined, and performing the tracking control may be determined based on the result. At this time, if it is determined that the depth of field is insufficient, tracking control described below may be performed.

Figure 12:
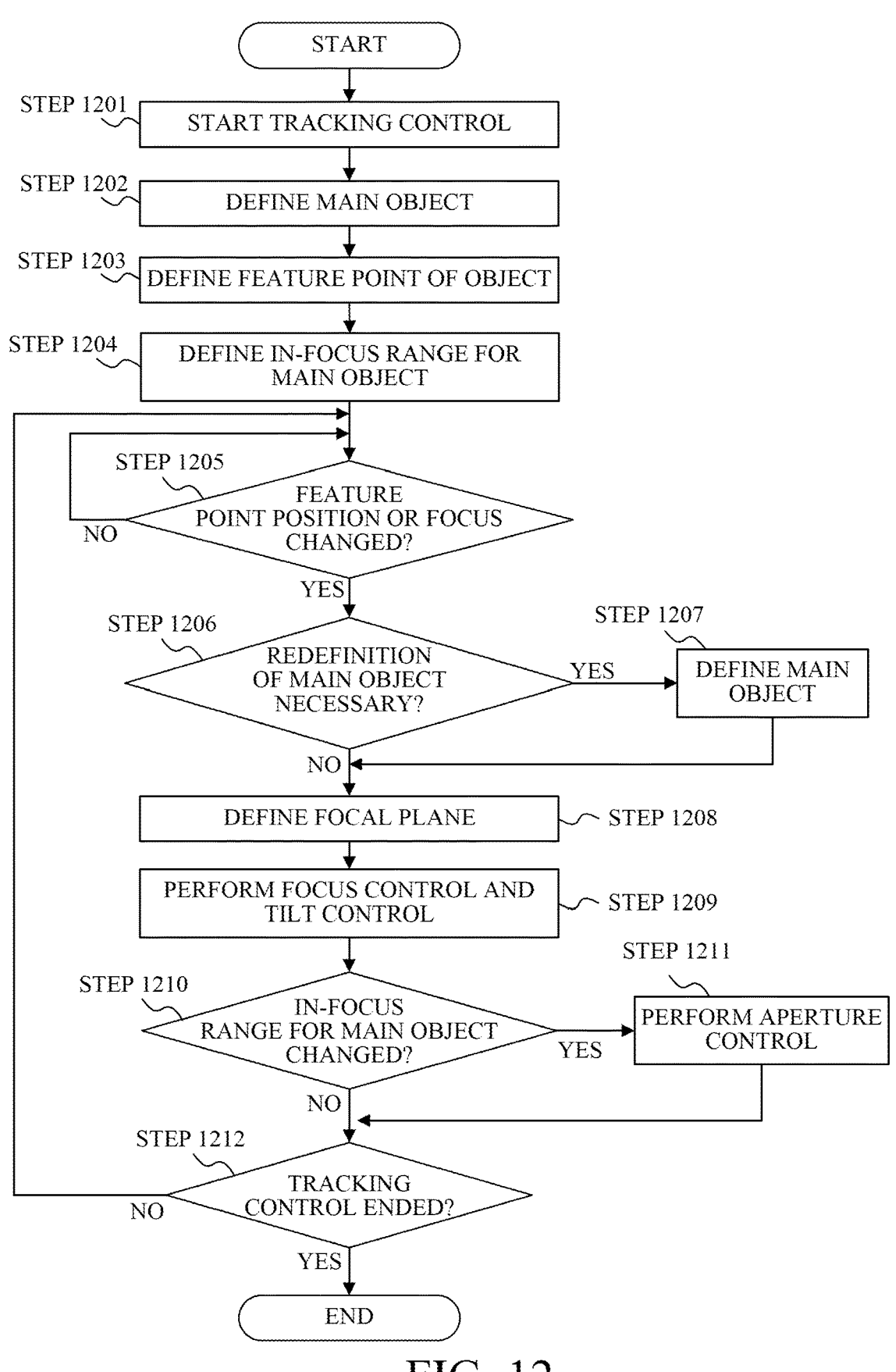
FIG. 12 is a flowchart illustrating other processing according to Example 4.

A flowchart in FIG. 12 illustrates tracking control processing in a case where the depth of field is insufficient for three objects. A description will now be mainly given of processing different from the processing in FIG. 11.

The processing in step 1201 is the same as the processing in step 1101 in FIG. 11.

In step 1202, the camera CPU 1100 defines a main object. The main object may be defined using the object distances and sizes of three objects as in Example 2, or the main object may be defined only by the object distance in imaging three objects whose sizes do not differ much for the imaging range.

The processing in step 1203 is the same as the processing in step 1102 in FIG. 11.

In step 1204, the camera CPU 1101 defines an in-focus range for the main object. More specifically, an object axis for the main object is defined, and the in-focus range on the object axis, which is calculated from the depth of field and the tilt amount of the focal plane for the object axis, is defined as the in-focus range for the main object. The details will be described below.

The processing in step 1205 is the same as the processing in step 1103 in FIG. 11.

In a case where the feature point position or focus state changes in step 1205, the camera CPU 1101 determines whether the main object needs to be redefined in step 1206. This determination is made in the same manner as step 705 of Example 2 (FIG. 7). In a case where the redefinition is necessary, the main object is redefined in step 1207, and in a case where the redefinition is unnecessary, processing in step 1208 is performed.

The processing in steps 1208 and 1209 is the same as the processing in steps 1104 and 1105 in FIG. 11, respectively.

In step 1210, the camera CPU 1100 determines whether there is a change in the in-focus range for the main object. That is, in comparison with the in-focus range defined in step 1203, it is determined whether or not the in-focus range has changed when the same definition is made again. This example determines whether there is a change in the in-focus range calculated from the depth of field and the tilt amount of the focal plane relative to the object axis. In a case where there is the change, the processing in step 1211 is performed, and in a case where there is no change, the processing in step 1212 is performed.

In step 1211, the camera CPU 1100 performs aperture control. As described above, the depth of field is determined by the focal length, F-number, and object distance of the optical system. Since there are three feature points in this example, the tilt direction and tilt amount are uniquely determined, so even if the in-focus range for the main object changes, it is difficult for the tilt control to change the in-focus range for the main object. Therefore, changing the in-focus range by adjusting the aperture stop and changing the depth of field can maintain the in-focus range for the main object. Thereafter, the camera CPU 1100 performs the processing of step 1212.

The processing in step 1212 is the same as the processing in step 1106 in FIG. 11.

Figure 13:
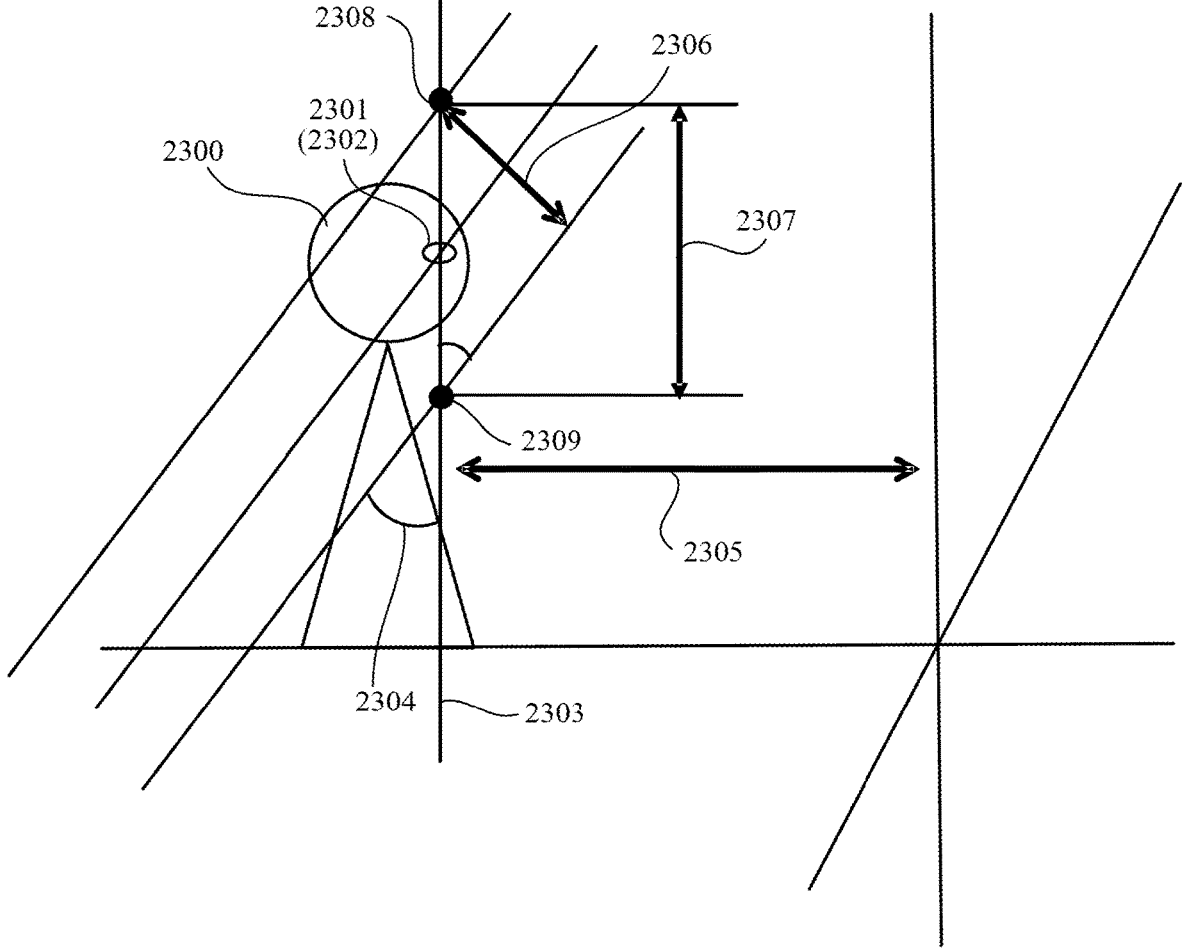
FIG. 13 explains the definition of a focus range.

FIG. 13 illustrates a method of defining the in-focus range for the main object in step 1204. In the following description, the pupil of the main object is defined as a feature point in step 1203.

An object 2300 has a pupil 2301 as a feature point, and this pupil 2301 is defined as a first feature point 2302 by the camera CPU 1100. First, in step 1204, the camera CPU 1100 defines a gravity axis passing through the first feature point 2302 as an object axis 2303 on the image sensor 3. In scenes where people and objects move, they are moving relative to gravity, so the effects of this example described above can also be obtained with this definition.

Next, the camera CPU 1101 defines a focal plane from the tilt direction, tilt amount, and focus position of the optical system. In a case where the first feature point 2302 is in focus, the first feature point 2302 becomes the intersection of the object axis 2303 and the focal plane. At this time, the tilt amount 2304 of the focal plane relative to the object axis 2303 in the normal direction of the image sensor 3 can be calculated from the expression representing the object axis 2303 and the expression representing the focal plane. The distance to the first feature point 2302 (object distance) 2305 can be calculated from a phase difference detected by the focus detector 1104 as described above. The depth of field 2306 can be calculated from a permissible circle of confusion, the F-number, and the focal length of the optical system and the object distance, as described above. In other words, the in-focus range 2307 can be calculated from the depth of field 2306 in the direction of the object axis passing through the feature point and the tilt amount 2304 using the following equation (1), and this is defined as the in-focus range for the main object.

$$\text{Focus range for main object} = \text{Depth of field}/\sin(\text{tilt amount}) \quad (1)$$

Thus, defining the in-focus range for the main object can provide the same effect as that when the in-focus state of the fourth feature point 2308 and the fifth feature point 2309 as both ends of the in-focus range 2307 for the object 2300 is maintained.

In step 1211 of FIG. 12, the depth of field 2306 is controlled by changing the F-number based on equation (1). Thereby, the in-focus range for the main object can be maintained. Defining a main object as in Example 2 can also maintain the in-focus range for a sub object different from the main object. That is, the F-number may be changed in at least one of a case where the in-focus range for the main object is insufficient only by tilt control of the focal plane, and a case where the in-focus range for the sub object changes.

In steps 1204 and 1210, the size of the in-focus range on the spatial coordinates for the main object may be calculated from the object distance of the main object on the image sensor 3 and the focal length of the optical system, and in step 1210, it may be determined whether this in-focus range has changed. In this case, storing a relationship between the object distance and the aperture stop at which the in-focus range has changed can maintain the in-focus range for the main object.

Regarding the size of the in-focus range on the spatial coordinates, in imaging an object such as a human face that has a fixed upper limit in size and has few individual differences, the upper limit value may be assumed to be the object size. At this time, tracking control may be performed when the in-focus range for the main object becomes smaller than the size of the main object.

Example 5

Example 5 performs tracking control to control the in-focus range to include a plurality of moving objects. In this example, the camera body 2 stores object information in an unillustrated memory. The object information includes face information about an object, and information such as a pupil position, a face size, and the height of a person as related elements associated with the face information. The user can specify the order of the related elements in the object information, and the camera CPU 1100 can perform imaging based on the related elements that are higher in that order.

Figure 14:
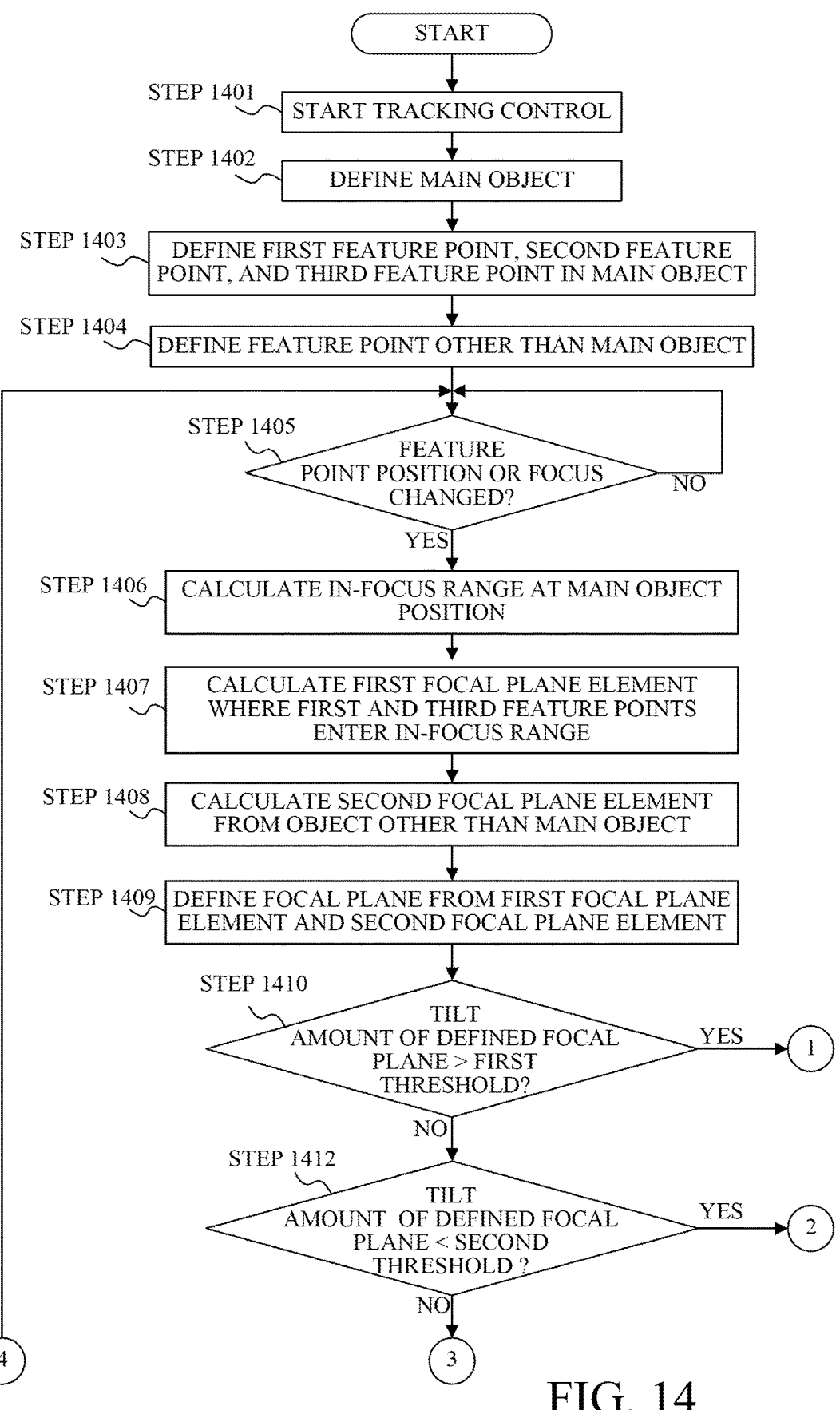
FIG. 14 is a flowchart illustrating processing according to Example 5.
Figure 15:
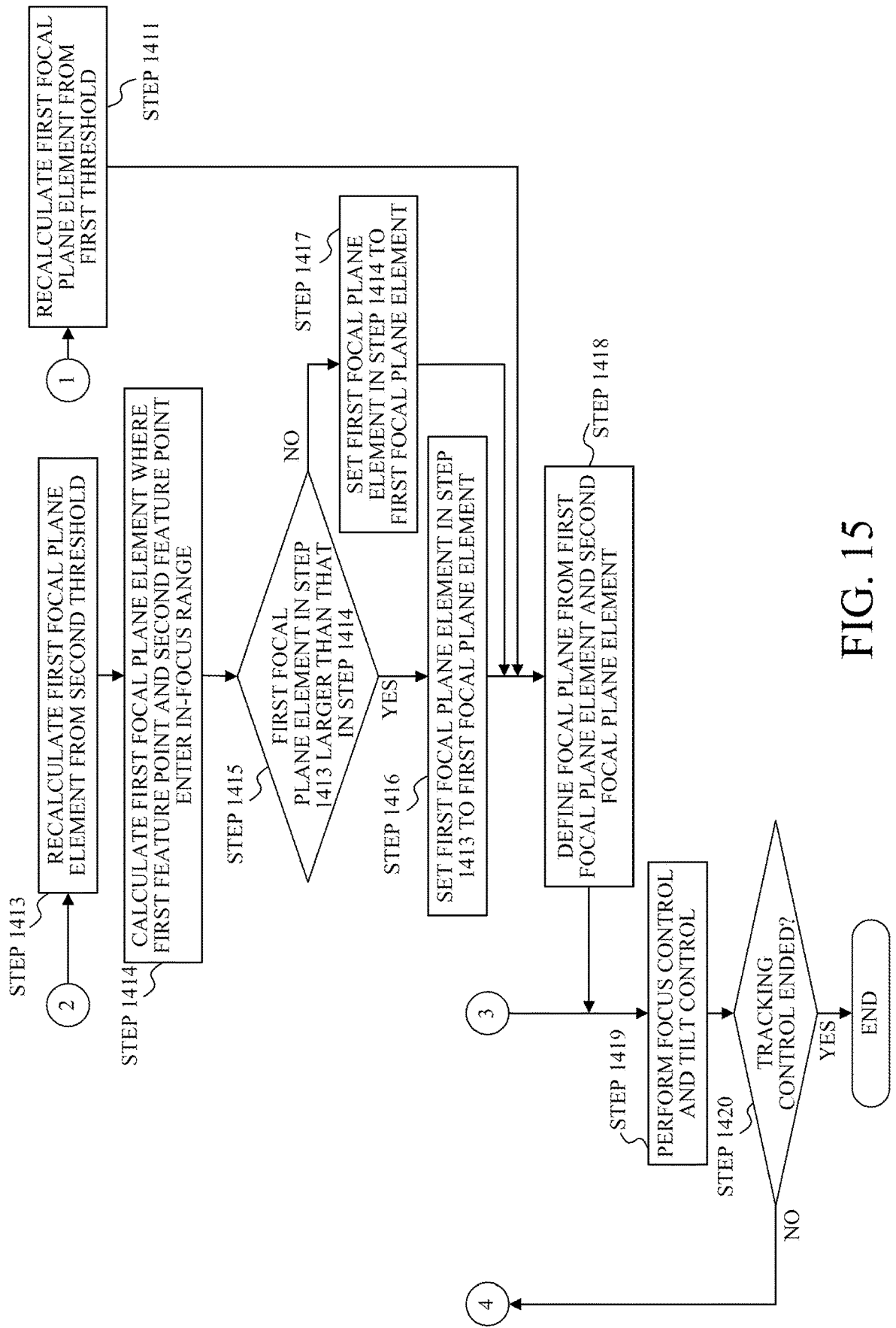
FIG. 15 is a flowchart following the flowchart of FIG. 14.

Flowcharts in FIGS. 14 and 15 illustrate tracking control processing (focal plane control method) according to Example 5. Portions with the same encircled numbers in FIGS. 14 and 15 are connected to each other. The camera CPU 1100 executes this processing according to a computer program.

In a case where the user selects a tracking mode for tracking and focusing on an object, the camera CPU 1100 starts the tracking control in step 1401. At this time, the user selects an object to be imaged through the operation of the TS instruction unit 1109, and also determines a desired tilt angle.

In step 1402, the camera CPU 1100 defines a main object from the image data obtained through the image sensor 3. Here, an object having a specific face in the object information is defined as the main object, and the highest related element (for example, a pupil) in the object information about the main object is determined as the pupil of the main object.

In step 1403, the camera CPU 1100 defines a first feature point in the main object, a second feature point and a third feature point from the highest rank in the object information. For example, the camera CPU 1100 defines the midpoint between the two pupils of the main object as the first feature point based on the pupil positions included in the object information. The camera CPU 1100 defines, as the object axis on the spatial coordinates, an intersection line between a plane that passes through the midpoint of the two pupils of the main object and is orthogonal to a line that connects the two pupils, and a plane that includes a gravity axis that passes through the midpoint of the two pupils of the main object and a line that connects the two pupils. Then, on the object axis on the spatial coordinates, a second feature point and a third feature point are defined in order from the first feature point towards the bottom based on the face size and person's height included in the object information.

In step 1404, the camera CPU 1100 defines feature points for sub objects different from the main object. For example, the feature point is defined as the midpoint between the two pupils of the sub object.

In step 1405, the camera CPU 1100 determines whether at least one of any one of the feature point positions and a focus state has changed. The camera CPU 1100 performs the processing of step 1406 in a case where at least one of the feature point position and focus state has changed, and repeats this determination in a case where at least one of the feature point position and focus state has not changed.

In step 1406, the camera CPU 1100 calculates the in-focus range for the main object. The calculation method is the same as that of Example 4.

In step 1407, the camera CPU 1100 determines a first focal plane element from the in-focus range for the main object and the above first feature point and third feature point. The first focal plane element is an element for determining the focal plane for the main object, and in this example relates to the tilt amount of the focal plane relative to the object axis. In this example, the focus position is set so that the pupil is in focus. Therefore, an angle can be calculated between the focal plane passing through the pupil position and the object axis at a position where the in-focus range passes through the first feature point or the third feature point. At this time, an axis on the spatial coordinates can be defined from the pupil position, the object axis, and the tilt amount between the focal plane and the object axis, and this axis is defined as the first focal plane element.

The feature point about the main object in the first focal plane element may be one of the two feature points set by the user, the closest and farthest feature points in the main object, and the feature point detected from the image data. The axis passing through the above feature point in the first focal plane element is the gravity axis, the axis defined by the user, the axis calculated from the main object, the axis calculated from the movement of the main object, and the first focal plane element.

In step 1408, the camera CPU 1100 calculates the second focal plane element from the sub object different from the main object. The second focal plane element is an element for determining the focal plane for the sub object. More specifically, a straight line passing from the midpoint of the two pupils of the main object to the midpoint (or its vicinity) of the two pupils of one or more sub objects other than the main object is calculated on the spatial coordinates. In a case where only one main object and one sub object exist, a straight line passing through the midpoint of the two pupils of the main object and the midpoint of the pupils of the sub object is calculated. The calculated straight line can be defined as an axis on the spatial coordinates passing through the pupil position of the main object, and this axis is defined as the second focal plane element.

The second focal plane element is defined by any one of the following axes: an axis passing through a feature point about a sub object and another feature point about a sub object; an axis passing through a feature point about a main object and a feature point about a sub object; an axis calculated from a change in information about a distance to the feature point about the main object or a change in a position of any one of a plurality of feature points within an imaging area (imaging screen); an axis that approximates positions of a plurality of feature points; an axis calculated from the in-focus area in image data (on captured image); and an axis selected by the user.

In step 1409, the camera CPU 1100 defines a focal plane from the first focal plane element and the second focal plane element. Since both the first focal plane element and the second focal plane element are axes passing through the pupil of the main object, the focal plane can be defined.

In step 1410, the camera CPU 1100 calculates the tilt amount of the optical system from the defined focal plane, and determines whether this is larger than a first threshold (first predetermined value). The camera CPU 1100 performs the processing of step 1411 in a case where the tilt amount is greater than the first threshold, and performs the processing of step 1412 in a case where the tilt amount is equal to or less than the first threshold.

In step 1411, the camera CPU 1100 calculates the first focal plane element, which is the tilt amount corresponding to the first threshold, by changing the first focal plane element without changing the second focal plane element. This example focuses on the pupil, the feature point farthest from the camera system is the third feature point. In other words, confirming that the third feature point is within the depth of field is equivalent to confirming that all feature points are in focus. At this time, the camera CPU 1100 changes the tilt amount of the focal plane relative to the object axis as the first focal plane element so that the tilt amount accords with the first threshold. Thereafter, the processing of step 1418 is performed.

On the other hand, in step 1412, the camera CPU 1100 calculates the tilt amount of the optical system from the defined focal plane, and determines whether this is smaller than a second threshold (second predetermined value). In a case where the tilt amount is smaller than the second threshold, the processing of step 1413 is performed, and in a case where the tilt amount is equal to or greater than the second threshold, the processing of step 1419 is performed.

In step 1413, the camera CPU 1100 calculates the first focal plane element as the tilt amount corresponding to the second threshold, by changing the first focal plane element without changing the second focal plane element. The camera CPU 1100 changes the tilt amount of the focal plane relative to the object axis as the first focal plane element so that the tilt amount accords with the first threshold.

In step 1414, the camera CPU 1100 calculates a first focal plane element in which the first feature point and the second feature point fall within the in-focus range. The calculation method is as explained in step 1407.

In step 1415, the camera CPU 1100 determines whether the first focal plane element (tilt amount) calculated in step 1413 is larger than the first focal plane element calculated in step 1414. In a case where the first focal plane element calculated in step 1413 is larger than the first focal plane element calculated in step 1414, processing of step 1416 is performed. In a case where the first focal plane element calculated in step 1413 is equal to or smaller than the first focal plane element calculated in step 1414, the processing of step 1417 is performed.

In step 1416, the camera CPU 1100 sets the first focal plane element calculated in step 1413 as the final first focal plane element. Then, the processing of step 1418 is performed.

In step 1417, the camera CPU 1100 sets the first focal plane element calculated in step 1414 as the final first focal plane element. Then, the processing of step 1418 is performed.

In step 1418, the camera CPU 1100 defines a focal plane from the first focal plane element and the second focal plane element set in step 1416 or 1417.

In step 1419, the camera CPU 1100 performs focus control and tilt control to accord the focal plane of the optical system with the defined focal plane.

In step 1420, the camera CPU 1100 determines whether there is an instruction from the user to end the tracking control, and in a case where there is no instruction to end, the flow returns to step 14405, and in a case where there is the end instruction, this flow ends.

The above tracking control can set the upper and lower limits of the tilt amount of the focal plane. In performing reverse tilt imaging, the tilt of the focal plane determines the in-focus range of the entire image sensor 3 (referred to as an on-sensor focus range hereinafter), and as the tilt amount of the focal plane increases, the on-sensor focus range becomes narrower. That is, setting the upper limit to the tilt amount of the focal plane can prevent the on-sensor focal range from becoming narrower than a certain width. On the other hand, setting a lower limit to the tilt amount of the focal plane can prevent the on-sensor focal range from becoming wider than a certain width. If a face cannot be captured in the focal plane defined by the first feature point and the second feature point, control can allow the tilt amount to fall below the lower limit. Thereby, the in-focus state of a target, such as a face of an object, can be maintained.

In other words, in a case where the object is distant, tilting the focal plane to the upper limit can control the width of the on-sensor in-focus range so that it does not become narrower than a certain amount. In a case where the object is distant, the depth of field for the object is deep and the object can be tracked while the entire object can be captured. In a case where an object is close, the tilt amount of the focal plane may be small in order to focus on the object. However, determining the lower limit of the tilt amount can control the width of the on-sensor in-focus range so that it does not become larger than a certain amount and the on-sensor in-focus range can be narrow enough to image the face. Then, in a case where the object is close and the face size is larger than the set in-focus range, removing the limit on the tilt amount of the focal plane can expand the on-sensor in-focus range and bring the face into focus.

Figure 16:
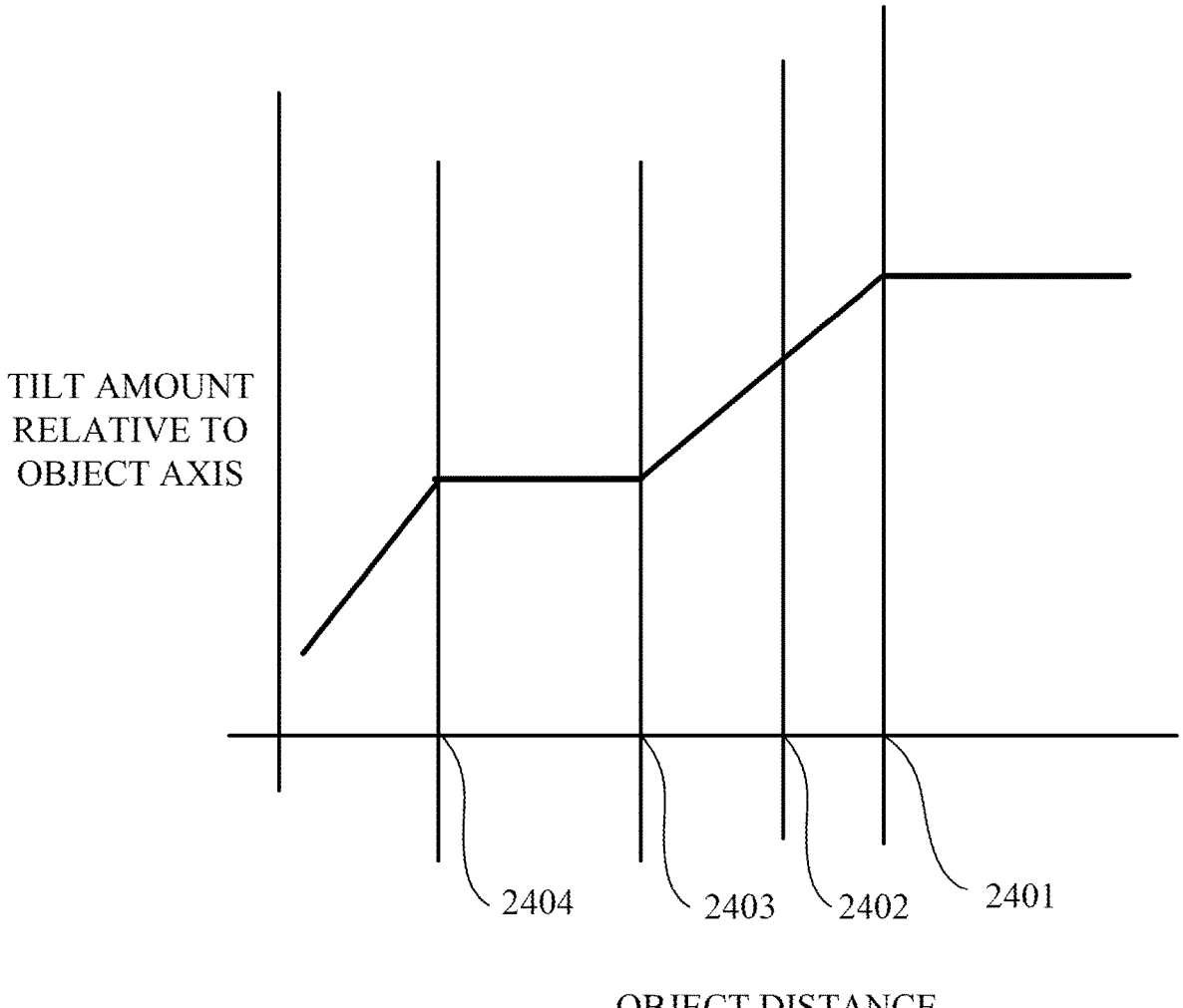
FIG. 16 is a graph illustrating a relationship between an object distance to a main object and a tilt amount of a focal plane in the processing of FIGS. 14 and 15.

A graph in FIG. 16 illustrates a relationship between an object distance of the main object and a tilt amount of the focal plane relative the object axis in a case where the tracking control processing illustrated in FIGS. 14 and 15 is performed. The imaging situation in this graph is an example where the tilt amount is determined only by the main object. The horizontal axis illustrates the object distance, and the vertical axis illustrates the tilt amount on the focal plane.

A first distance area that is farther than a first object distance 2401 is an area where the tilt amount is determined by the first threshold. In other words, this is an area where the tilt amount is larger than the first threshold. This first distance area is an area where the entire main object is sufficiently included in the depth of field. Therefore, the camera CPU 1100 performs control so that the tilt amount is constant in the first distance area and the on-sensor in-focus range is constant. That is, the camera CPU 1100 keeps the tilt amount constant in a case where the in-focus range calculated from the distance to the main object, the F-number of the optical system, the focal length of the optical system, and the tilt amount of the focal plane is larger than the main object.

A second distance area between the first object distance 2401 and a second object distance 2402 is an area where the tilt amount is determined by the on-sensor in-focus range. In this second distance area, the camera CPU 1100 performs control such that the on-sensor in-focus range is wider than the first distance area so that the entire main object is in focus.

A third distance area between the second object distance 2402 and a third object distance 2403 is an area in which the tilt amount changes in the in-focus range for the main object. In this third distance range, camera CPU 1100 determines the tilt amount so that the entire object is captured. In other words, control is performed to change the on-sensor in-focus range according to the range of the main object.

A fourth distance area between the third object distance 2403 and a fourth object distance 2404 is an area where the tilt amount is determined by the second threshold. In other words, this is an area where the tilt amount is smaller than the second threshold. In this fourth distance area, the entire main object does not fall within the depth of field, but the tilt amount is kept constant. In other words, control is performed so that the on-sensor in-focus range is constant.

A fifth distance area closer than the fourth object distance 2404 is an area in which the tilt amount is changed in the in-focus range for the main object. At this fourth object distance 2404, the face of the main object is in focus, and control is performed to make the on-sensor in-focus range wider than the fourth distance range.

Thus, the tracking control illustrated in FIGS. 14 and 15 can perform imaging while adjusting the in-focus range for the main object and the on-sensor in-focus range. Since the on-sensor in-focus range is also an important element in image expression, this control enables the captured image intended by the user.

In this example, the second focal plane element is a straight line passing through a plurality of objects (or their vicinity) including the main object. Therefore, in scenes where a positional relationship among a plurality of objects (athletes) does not significantly shift, such as a sprint in a sports day, the in-focus range can be approximately maintained not only for the main object but also for surrounding objects.

This example focuses on the pupil of each object. Therefore, changes in the focus states at the first feature point (a point on the object axis in spatial coordinates), the second feature point, and the third feature point correspond to the changes in a position, tilt on the focal plane, and depth of field of each feature point on the object axis in spatial coordinates.

In a case where the main object is no longer recognized, the main object is redefined according to the order of objects stored as object information. In a case where there is no object that accords with the object information, the closest object may be set as the main object.

The first focal plane element may be set for each object distance in advance using object information, F-number, and focal length, and the first focal plane element may be changed based on it.

This example sets the first focal plane element by finding a straight line on the spatial coordinates that passes through a plurality of objects including the main object, but the first focal plane element may be set by finding a straight line connecting two registered objects. In this case, in a case where only a single object comes to be recognized, control may be performed such that the straight line is not changed. In tracking two registered objects, the closest object among those objects may be set as the main object.

This example sets a focus position so that a pupil position is in focus, but the focus position may be set so that a position that shifts from the pupil position on an axis in the spatial coordinates, such as the midpoint between the first feature point and the third feature point on the object axis on the spatial coordinates. In this case, by setting the lower limit of the tilt amount of the focal plane, the set point of the focus position changes from the midpoint between the first feature point and the third feature point to the first feature point side as the depth of field for the object decreases. Finally, the set position may change to the midpoint between the first feature point and the second feature point or to the pupil position.

This example has discussed control for guaranteeing the in-focus range for the main object, but in order to guarantee the in-focus range for another object, a feature point about the other object may be provided and changes in the focus state may be tracked. In this case, adjusting the F-number as described in Example 4 can easily maintain the in-focus range for the other object.

This example defines two feature points in an in-focus area of an object, but may define a collection of a plurality of points in the in-focus area as a single feature point, and perform tilt control to correct an out-of-focus situation.

In each example, the camera CPU 1100 as a control unit is provided in a lens interchangeable type image pickup apparatus as an optical apparatus, but a control unit corresponding to the camera CPU 1100 may be provided in a lens integrated type image pickup apparatus as an optical apparatus.

The lens CPU 1000 may have a function equivalent to the camera CPU 1100. That is, the lens CPU serving as a control unit in the lens unit may acquire information about a plurality of feature points and distances to the plurality of feature points through communication from the camera body. Then, the lens CPU may perform tilt control in accordance with a change in at least one of the information about the distance and the position of one of the plurality of feature points within the imaging area.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can continue tracking and focusing on a moving object.

This application claims priority to Japanese Patent Application No. 2023-026747, which was filed on Feb. 22, 2023, and which is hereby incorporated by reference herein in its entirety.

What is claimed is:

1. A control apparatus comprising:
a memory storing instructions; and
a processor configured to execute the instructions to:
    acquire first information on a plurality of feature points about an object from image data obtained by imaging;
    acquire second information on distances to the plurality of feature points;
    control driving of a movable lens so that a tilt amount of a focal plane in an optical system changes, according to a change in at least one of the second information or a position of one of the plurality of feature points within an imaging area; and
    change an aperture value of the optical system in at least one of:
        a case where a focus range of the optical system for a main object becomes insufficient in driving the movable lens; or
        a case where a focus range of the optical system for a sub object different from the main object changes.

2. The control apparatus according to claim 1, wherein the processor is configured to control driving of the movable lens so that at least two feature points relating to the main object among the plurality of feature points are maintained in focus.

3. The control apparatus according to claim 2, wherein the processor is configured to determine as the main object any one of an object selected by a user, an object matching a registered pattern, a closest object, or an object calculated from a distance and size.

4. The control apparatus according to claim 1, wherein the processor is configured to control driving of the movable lens based a first focal plane element for determining a focal plane for the main object and a second focal plane element for determining a focal plane for the sub object.

5. The control apparatus according to claim 4, wherein the first focal plane element includes an axis defined by a tilt amount of the focal plane relative to an axis passing through at least one feature point regarding the main object.

6. The control apparatus according to claim 5, wherein the at least one feature point regarding the main object in the first focal plane element includes one of:
two feature points set by a user;
closest and farthest feature points in the main object; or
a feature point detected from the image data.

7. The control apparatus according to claim 5, wherein the axis passing through the at least one feature point in the first focal plane element is defined by using one of:
a gravity axis;
an axis defined by a user;
an axis calculated from the main object;
an axis calculated from a motion of the main object; or
an axis calculated from the first focal plane element.

8. The control apparatus according to claim 4, wherein the second focal plane element is defined by one of:

an axis passing through one of the feature points regarding the sub object and another one of the feature points regarding the sub object;

an axis passing through one of the feature points regarding the main object and the another one of the feature points regarding the sub object;

an axis calculated from a change in information about a distance to the one of the feature points regarding the main object or a change in a positional relationship of the plurality of feature points within the imaging area;

an axis that approximates positions of the plurality of feature points, an axis calculated from an in-focus area on a captured image; or an axis selected by a user.

9. The control apparatus according to claim 1, wherein the processor is configured to control driving of the movable lens so that a tilt angle of the focal plane becomes smaller as the focus range of the optical system for the main object becomes smaller.

10. The control apparatus according to claim 1, wherein the processor is configured to set the tilt amount constant in a case where the focus range of the optical system for the main object, calculated from a distance to the main object, the aperture value of the optical system, a focal length of the optical system, and the tilt amount of the focal plane, is larger than the main object.

11. The control apparatus according to claim 1, wherein the processor is configured to change the focus range of the optical system for the main object according to a driving amount of the movable lens.

12. The control apparatus according to claim 1, wherein the processor is configured to focus on the plurality of feature points by controlling driving of a focus element included in the optical system in addition to driving of the movable lens.

13. An image pickup apparatus comprising:

the control apparatus according to claim 1; and an image sensor configured to capture an object image.

14. A lens apparatus comprising:

the control apparatus according to claim 1; and the optical system including the movable lens.

15. A focal plane control method comprising the steps of:

acquiring first information on a plurality of feature points about an object from image data obtained by imaging;

acquiring second information on distances to the plurality of feature points;

controlling driving of a movable lens so that a tilt amount of a focal plane in an optical system changes, according to a change in at least one of the second information or a position of one of the plurality of feature points within an imaging area; and changing an aperture value of the optical system in at least one of:

a case where a focus range of the optical system for a main object becomes insufficient in driving the movable lens; or a case where a focus range of the optical system for a sub object different from the main object changes.

16. A non-transitory computer-readable storage medium storing a program executable by a computer to execute the method according to claim 15.

17. A control apparatus comprising:

a memory storing instructions; and a processor configured to execute the instructions to:

acquire first information on a plurality of feature points about an object from image data obtained by imaging;

acquire second information on distances to the plurality of feature points;

control driving of a movable lens so that a tilt amount of a focal plane in an optical system changes, according to a change in at least one of the second information or a position of one of the plurality of feature points within an imaging area; and set the tilt amount constant in a case where a focus range of the optical system for a main object, calculated from a distance to the main object, an aperture value of the optical system, a focal length of the optical system, and the tilt amount of the focal plane, is larger than the main object.

* * * * *